US008204225B2

(12) United States Patent
Balabine et al.

(10) Patent No.: US 8,204,225 B2
(45) Date of Patent: Jun. 19, 2012

(54) METHOD AND APPARATUS FOR PROVIDING SECURITY IN A RADIO FREQUENCY IDENTIFICATION SYSTEM

(75) Inventors: Igor V. Balabine, Menlo Park, CA (US); Nikola Cargonja, San Carlos, CA (US); Allan M. Evans, Cupertino, CA (US); Liping Julia Zhu, San Jose, CA (US); Devendra Shiledar, Pleasanton, CA (US); Stephen Alan Stough, Reno, NV (US)

(73) Assignee: Savi Technology, Inc., Mountain View, CA (US)

( * ) Notice: Subject to any disclaimer, the term of this patent is extended or adjusted under 35 U.S.C. 154(b) by 872 days.

(21) Appl. No.: 11/967,907

(22) Filed: Dec. 31, 2007

(65) Prior Publication Data
US 2009/0028334 A1 Jan. 29, 2009

Related U.S. Application Data

(60) Provisional application No. 60/951,334, filed on Jul. 23, 2007.

(51) Int. Cl.
*H04L 9/06* (2006.01)
*G08B 13/14* (2006.01)

(52) U.S. Cl. ........................................ 380/270; 380/277
(58) Field of Classification Search .................. 380/270, 380/277; 340/572
See application file for complete search history.

(56) References Cited

U.S. PATENT DOCUMENTS

| | | | |
|---|---|---|---|
| 5,600,723 A | 2/1997 | Woodall et al. | |
| 5,640,151 A | 6/1997 | Reis et al. | |
| 5,686,902 A | 11/1997 | Reis et al. | |
| 5,995,630 A | 11/1999 | Borza | |
| 6,499,105 B1 | 12/2002 | Yoshiura et al. | |
| 6,988,071 B1 | 1/2006 | Gazdzinski | |
| 7,093,693 B1 | 8/2006 | Gazdzinski | |
| 7,156,312 B2 * | 1/2007 | Becker et al. | 235/492 |
| 7,183,924 B1 | 2/2007 | Ku | |
| 7,584,351 B2 | 9/2009 | Kakii | |

(Continued)

FOREIGN PATENT DOCUMENTS
WO WO 2004/088579 A1 10/2004

OTHER PUBLICATIONS

Kim, et al., "Review report of Standardization Issues on Network Aspects of Identification including RFID", International Telecommunication Union, Telecommunication Standardization Sector, Study Group 17, Delayed Contribution 155, Korea, pp. 1-49, Apr. 19-28, 2006.

(Continued)

*Primary Examiner* — Kambiz Zand
*Assistant Examiner* — Aubrey Wyszynski
(74) *Attorney, Agent, or Firm* — Haynes and Boone, LLP

(57) ABSTRACT

One aspect involves a communication that contains a portion encrypted with a selected key can be wirelessly transmitted by a part for reception and decryption by plural tags. A different aspect involves a tag receiving a first sequence of wireless communications that each contain sequencing information regarding the first sequence, while receiving a second sequence of wireless communications that each include sequencing information regarding the second sequence, and further involves monitoring the sequencing information from received communications of the first sequence while separately monitoring the sequencing information from received communications of the second sequence.

10 Claims, 12 Drawing Sheets

U.S. PATENT DOCUMENTS

| | | | |
|---|---|---|---|
| 7,620,814 | B2 | 11/2009 | Ondet et al. |
| 7,627,896 | B2 | 12/2009 | Herrmann |
| 7,644,280 | B2 | 1/2010 | Carro |
| 7,702,107 | B1 | 4/2010 | Messing |
| 7,711,565 | B1 | 5/2010 | Gazdzinski |
| 7,783,035 | B2 | 8/2010 | Sperry et al. |
| 7,826,614 | B1 | 11/2010 | Kaniz et al. |
| 7,961,828 | B2* | 6/2011 | Callaway et al. .............. 375/354 |
| 7,971,253 | B1* | 6/2011 | Gupta ............................. 726/23 |
| 2002/0018561 | A1 | 2/2002 | Emelko |
| 2003/0036425 | A1 | 2/2003 | Kaminkow et al. |
| 2003/0037235 | A1 | 2/2003 | Aziz et al. |
| 2003/0063742 | A1 | 4/2003 | Neufeld et al. |
| 2003/0081778 | A1 | 5/2003 | Tsumagari et al. |
| 2003/0128843 | A1 | 7/2003 | Brown et al. |
| 2003/0206636 | A1 | 11/2003 | Ducharme et al. |
| 2003/0220903 | A1 | 11/2003 | Mont et al. |
| 2004/0030896 | A1 | 2/2004 | Sakamura et al. |
| 2004/0075551 | A1* | 4/2004 | Marino ...................... 340/539.1 |
| 2004/0085446 | A1 | 5/2004 | Park |
| 2004/0111625 | A1 | 6/2004 | Duffy et al. |
| 2005/0086479 | A1 | 4/2005 | Ondet et al. |
| 2005/0149442 | A1 | 7/2005 | Adams et al. |
| 2005/0229006 | A1 | 10/2005 | De Moura et al. |
| 2005/0259823 | A1 | 11/2005 | Apostol, Jr. et al. |
| 2006/0015729 | A1 | 1/2006 | Novack et al. |
| 2006/0046842 | A1 | 3/2006 | Mattice et al. |
| 2006/0085848 | A1 | 4/2006 | Aissi et al. |
| 2006/0161791 | A1 | 7/2006 | Bennett |
| 2006/0197651 | A1 | 9/2006 | Lee et al. |
| 2006/0206710 | A1 | 9/2006 | Gehrmann |
| 2006/0238353 | A1* | 10/2006 | Cox .......................... 340/572.7 |
| 2006/0290504 | A1 | 12/2006 | Wang |
| 2007/0013481 | A1 | 1/2007 | Zhu et al. |
| 2007/0028099 | A1 | 2/2007 | Entin et al. |
| 2007/0034691 | A1 | 2/2007 | Davis et al. |
| 2007/0091359 | A1 | 4/2007 | Suzuki et al. |
| 2007/0109124 | A1* | 5/2007 | Park et al. .................. 340/572.1 |
| 2007/0157309 | A1 | 7/2007 | Bin et al. |
| 2007/0189525 | A1 | 8/2007 | Wajs |
| 2007/0196909 | A1 | 8/2007 | Showalter et al. |
| 2007/0210923 | A1 | 9/2007 | Butler et al. |
| 2007/0219911 | A1 | 9/2007 | Abe |
| 2007/0271113 | A1 | 11/2007 | Nelson et al. |
| 2008/0037787 | A1 | 2/2008 | Boynton et al. |
| 2008/0040607 | A1 | 2/2008 | Kaabouch et al. |
| 2008/0104392 | A1* | 5/2008 | Satoshi et al. ................. 713/164 |
| 2008/0120700 | A1 | 5/2008 | Pandey et al. |
| 2008/0170695 | A1 | 7/2008 | Adler |
| 2008/0186137 | A1 | 8/2008 | Butler et al. |
| 2008/0186174 | A1* | 8/2008 | Alexis et al. ............... 340/572.1 |
| 2008/0199007 | A1 | 8/2008 | Candelore |
| 2008/0231438 | A1 | 9/2008 | Curcio |
| 2008/0231454 | A1 | 9/2008 | Curcio |
| 2008/0252459 | A1 | 10/2008 | Butler et al. |
| 2009/0028078 | A1 | 1/2009 | Balabine et al. |
| 2009/0028329 | A1 | 1/2009 | Balabine et al. |
| 2009/0028333 | A1 | 1/2009 | Balabine et al. |
| 2009/0028337 | A1 | 1/2009 | Balabine et al. |
| 2009/0132760 | A1 | 5/2009 | Flynn et al. |
| 2009/0187766 | A1 | 7/2009 | Vuillaume et al. |
| 2009/0224884 | A1 | 9/2009 | Tuttle |
| 2010/0067704 | A1 | 3/2010 | Hauge et al. |
| 2010/0116892 | A1 | 5/2010 | Hollins et al. |
| 2010/0134257 | A1 | 6/2010 | Puleston et al. |

OTHER PUBLICATIONS

"Invitation to Pay Additional Fees" with Annex (Form PCT/ISA/206) mailed by the European Patent Office on May 26, 2009 in PCT Application No. PCT/US2008/070614, 8 pages.
PCT Search Report (Forms PCT/ISA/220 and 210) and PCT Written Opinion (Form PCT/ISA/237) mailed by the European Patent Office on Jul. 17, 2009 in PCT Application No. PCT/US2008/070614, 18 pages.
PCT International Preliminary Report on Patentability (IPRP, Forms PCT/IB/373 and PCT/ISA/237) issued by the International Bureau on Jan. 26, 2010 in PCT Application No. PCT/US2008/070614, 10 pages.
International Standard—ISO/IEC FDIS 18000-7, Information Technology—Radio Frequency Identification for Item Management, Part 7, 2009, 74 pages.
Office Action dated Dec. 8, 2010, in related U.S. Appl. No. 11/967,859.
Response to Office Action filed Apr. 1, 2011, in related U.S. Appl. No. 11/967,859.
Office Action dated Dec. 22, 2010, in related U.S. Appl. No. 11/967,951.
Response to Office Action filed May 23, 2011, in related U.S. Appl. No. 11/967,951.
Office Action dated Dec. 23, 2010, in related U.S. Appl. No. 11/967,977.
Response to Office Action filed May 23, 2011, in related U.S. Appl. No. 11/967,977.
Office Action dated Jan. 31, 2011, in related U.S. Appl. No. 11/968,002.
Non-Final Office dated Jun. 22, 2011, in related U.S. Appl. No. 11/967,859.
Amendment dated Sep. 22, 2011, in related U.S. Appl. No. 11/967,859.
Final Office Action dated Aug. 2, 2011, in related U.S. Appl. No. 11/967,951.
Amendment AF dated Nov. 2, 2011, in related U.S. Appl. No. 11/967,951.
Final Office Action dated Aug. 18, 2011, in related U.S. Appl. No. 11/967,977.
Amendment AF dated Nov. 18, 2011, in related U.S. Appl. No. 11/967,977.
Amendment dated May 31, 2011, in related U.S. Appl. No. 11/968,002.
Final Office Action dated Aug. 12, 2011, in related U.S. Appl. No. 11/968,002.
Amendment AF dated Nov. 14, 2011, in related U.S. Appl. No. 11/968,002.
Giuseppe Atenlese, et al, "Untraceable RFID Tags Via Insubvertible Encryption," CCCS '05 Proceedings of the 12th ACM Conference on Computer and Communication Security, ACM New York, NY, 2005 pp. 92-101.
Final Office dated Dec. 19, 2011, in related U.S. Appl. No. 11/967,859.
"Security Requirements for Cryptographic Modules", Federal Information Processing Standards Publication FIPS PUB 140-2, National Institute of Standards and Technology, Gaithersburg, Maryland, May 25, 2001, pp. i-viii and pp. 1-61.
"Advanced Encryption Standard (AES)", Federal Information Processing Standards Publication FIPS PUB 197, National Institute of Standards and Technology, Gaithersburg, Maryland, Nov. 26, 2001, pp. i-iv and pp. 1-47.
"Secure Hash Standard", Federal Information Processing Standards Publication FIPS PUB 180-2, National Institute of Standards and Technology, Gaithersburg, Maryland, Aug. 1, 2002, pp. i-iv and pp. 1-79.
Dworkin, "Recommendation for Block Ciphers Modes of Operation—Methods and Techniques", NIST Special Publication 800-38A, National Institute of Standards and Technology. Gaithersburg, Maryland, Dec. 2001, pp. i-vii and pp. 1-59.
Barker, "Recommendation for the Triple Data Encryption Algorithm (TDEA) Block Cipher", NIST Special Publication FIPS SP 800-67, National Institute of Standards and Technology, Gaithersburg, Maryland, May 2004, revised May 19, 2008, pp. i-x and pp. 1-30.

* cited by examiner

| PROTECTION SUITE DESCRIPTOR | ENCRYPTION | | | AUTHENTICATION | |
|---|---|---|---|---|---|
| | ALGORITHM | KEY SIZE, BIT | MODE | ALGORITHM | INFORMATION SIZE, BIT |
| AES-128-CTR-HMAC-SHA1-96 | AES | 128 | COUNTER | SHA-1 | 96 |
| AES-256-CCM-128 | AES | 256 | COUNTER WITH CBC-MAC | CBC-MAC | 128 |
| 3DES-CBC-HMAC-MD5 | 3DES | 168 | CIPHER BLOCK CHAINING | MD5 | 128 |
| NULL-HMAC-SHA1 | NONE | N/A | N/A | SHA-1 | 160 |
| NULL-NULL | NONE | N/A | N/A | NONE | N/A |

CRYPTOGRAPHIC INFORMATION TLV

| T | L | KEY SET ID | PROTECTION SUITE ID | COUNTER |
|---|---|---|---|---|

METHOD AND APPARATUS FOR PROVIDING SECURITY IN A RADIO FREQUENCY IDENTIFICATION SYSTEM

This application claims the priority under 35 U.S.C. §119 of provisional application No. 60/951,334 filed Jul. 23, 2007, the disclosure of which is hereby incorporated herein by reference.

FIELD OF THE INVENTION

This invention relates in general to radio frequency identification systems and, more particularly, to techniques for protecting information in radio frequency identification systems.

BACKGROUND

Radio frequency identification (RFID) systems are used in a variety of different applications. As one example, RFID systems are commonly used to track and monitor shipping containers or other objects. RFID tags are attached to the containers or other objects, and can exchange wireless communications with stationary interrogators. In order to provide end users with compatibility among components obtained from different manufacturers, an international industry standard for RFID communications has been developed and promulgated by the International Organization for standardization (ISO) in Geneva, Switzerland. This standard is commonly known as the art as the ISO 18000-7 standard.

Although the ISO 18000-7 standard been very beneficial, it offers little in the way of security for information. For example, the standard does not allow wireless messages to be encrypted, nor does it have any built-in extension mechanism that would permit the definition of proprietary messages within the protocol, such as proprietary messages with security provisions. Consequently, information transmitted in wireless messages under the ISO 18000-7 standard is fully visible to any entity that elects to receive the wireless messages. A third party may be able to emulate or interfere with ISO 18000-7 messages in various different ways. Consequently, while the ISO 18000-7 standard has been adequate and beneficial for its intended purposes, it has not been entirely satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
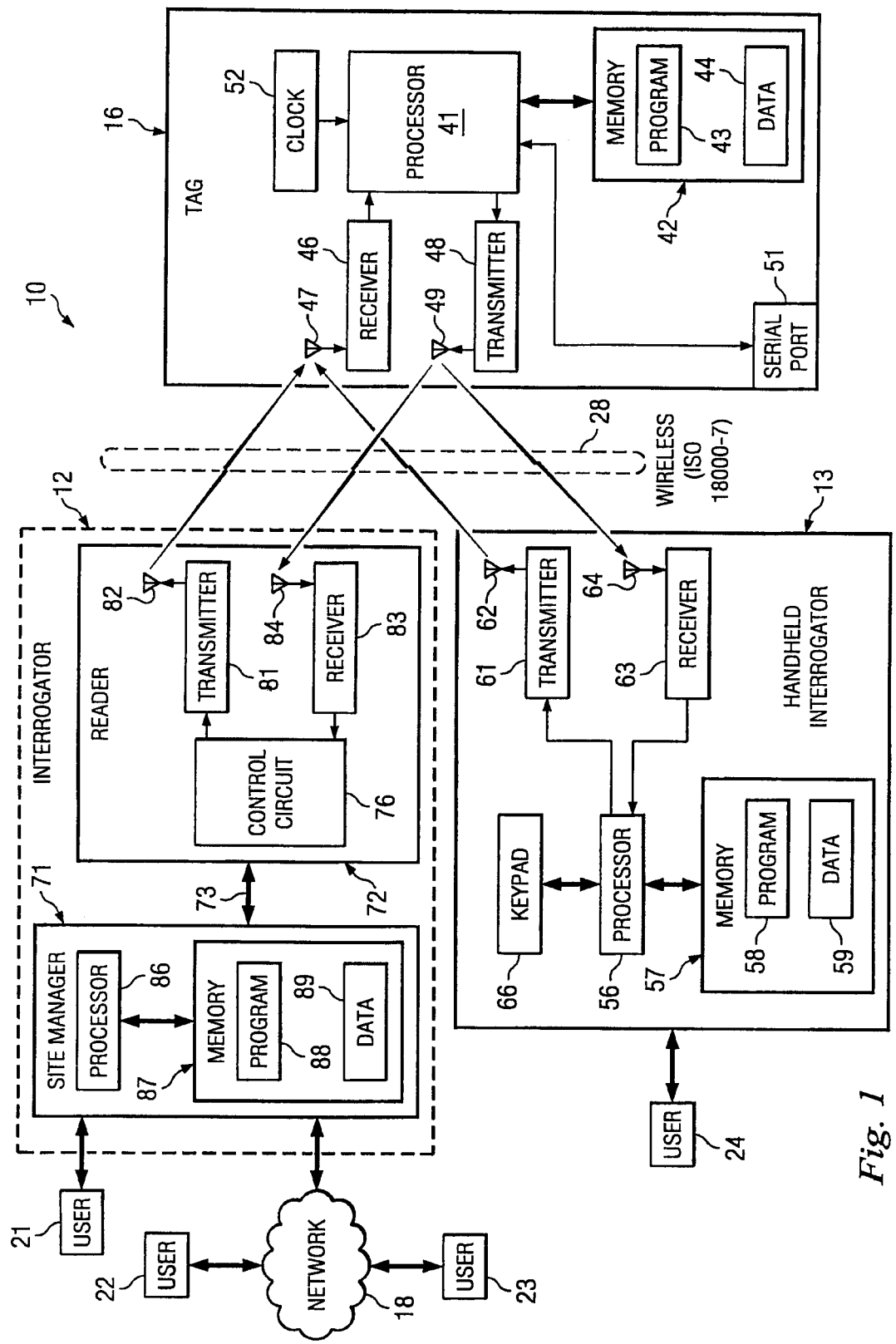
FIG. 1 is a block diagram of an apparatus that is a radio frequency identification (RFID) system, and that embodies aspects of the present invention.

FIG. 1 is a block diagram of an apparatus that is a radio frequency identification (RFID) system 10, and that embodies aspects of the present invention. The system 10 includes two interrogators 12 and 13, an RFID tag 16, and a network 18. FIG. 1 also shows several users 21-24 that can each use or interact with the system 10. A user may be an individual, an entity, a computer, or some other automated device. FIG. 1 is not intended to depict the entire RFID system. For example, the system actually includes a plurality of the tags 16, and more interrogators than just the two that are shown at 12 and 13. FIG. 1 shows only selected portions of the RFID system that facilitate an understanding of the present invention.

The tag 16 is a mobile, battery-operated device, and can communicate in a wireless manner with each of the interrogators 12 and 13, in particular by exchanging radio frequency (RF) wireless signals 28. In the disclosed embodiment, all of the wireless signals 28 conform to an existing international industry standard known as ISO 18000-7. This international standard was promulgated by the International Organization for Standardization (ISO), headquartered in Geneva, Switzerland. Persons skilled in the art are familiar with the ISO 18000-7 standard. For brevity and clarity in the discussion that follows, the term "ISO" is used as a shorthand way to refer to the ISO 18000-7 standard, and should be understood to be a reference to the ISO 18000-7 standard, rather than a reference to the ISO organization itself.

The circuitry within the tag 16 includes a processor 41 that is coupled to a memory 42. The memory 42 in FIG. 1 is a diagrammatic representation of two or more different types of memory, including but not limited to read-only memory (ROM), random access memory (RAM), and flash memory. The memory 42 contains a program 43 that is executed by the processor 41, and data 44 that is utilized by the program 43. The circuitry of the tag also includes a serial port 51, through which a not-illustrated external computer or other device can communicate serially with the processor 41. The tag 16 has an internal clock circuit 52 with a not-illustrated oscillator, allowing the tag 16 to maintain a record of the current date and time.

The circuitry of the tag further includes a radio frequency (RF) receiver 46 that is coupled to the processor 41 and to an antenna 47. The processor 41 can receive wireless signals 28 through the antenna 47 and receiver 46. The tag also includes an RF transmitter 48 that is coupled to the processor 41 and to an antenna 49. The processor 41 can transmit wireless signals 28 through the transmitter 48 and the antenna 49.

The interrogator 13 is a portable, battery-operated, handheld device that can be manually operated by a user 24 who is an individual. The circuitry in the interrogator 13 includes a processor 56 that is coupled to a memory 57. The memory 57 is a diagrammatic representation of various different types of memory, including but not limited to ROM, RAM and flash memory. The memory 57 contains a program 58 that is executed by the processor 56, as well as data 59 that is used by the program 58. The interrogator 13 includes an RF transmitter 61 that is coupled to the processor 56 and to an antenna 62. The processor 56 can transmit wireless signals 28 through the transmitter 61 and the antenna 62. The interrogator also includes an RF receiver 63 that is coupled to the processor 56 and to an antenna 64. The processor 41 can receive wireless signals 28 through the antenna 64 and the receiver 63. The handheld interrogator 13 further includes a keypad 66 that is coupled to the processor 56. The user 24 can manually operate the keypad 66 in order to enter information into the interrogator 13.

The interrogator 12 includes a site manager 71 and a reader 72 that are operatively coupled at 73. In the disclosed embodiment, the coupling 73 between the site manager 71 and reader 72 is hardwired rather than wireless, and in particular is a network that may conform to a well-known network protocol known as the Ethernet protocol. Alternatively, however, the site manager 71 and reader 72 could be coupled in any other convenient manner, and could even communicate using wireless signals. Within a given site, such as a shipping hub, there may be a plurality of the readers 72 that are provided at spaced locations and that are all coupled to the site manager 71 through the network 73. However, for simplicity and clarity, FIG. 1 shows only a single reader 72.

As explained earlier, the wireless signals 28 conform to the ISO 18000-7 industry standard, and the discussion below will focus to some extent on this industry standard. In the real world, the site manager 71 and reader 72 are separate and independent devices that are physically and functionally distinct. However, the ISO 18000-7 standard basically recognizes two general categories of devices, one of which is tags, and the other of which is interrogators. Therefore, for simplicity and clarity in the discussion that follows, the site manager 71 and the reader 72 are collectively referred to herein as an interrogator 12. In addition, and for simplicity and clarity, the reader 72 is considered herein to be essentially a pass-through device, which facilitates the exchange of ISO messages 28 between the site manager 71 and the tag 16, but without making substantive alterations to any of the messages traveling in either direction.

The reader 72 includes a circuit 76. An RF transmitter 81 is coupled to the circuit 76, and to an antenna 82. The circuit 76 can transmit wireless signals 28 through the transmitter 81 and the antenna 82. An RF receiver 83 is coupled to the circuit 76 and to an antenna 84. The circuit 76 can receive wireless signals 28 through the antenna 84 and the receiver 83.

The site manager 71 includes a processor 86 that is coupled to a memory 87. The memory 87 is a diagrammatic representation of various different types of memory, including but not limited to ROM, RAM and flash memory. The memory 87 stores a program 88 that is executed by the processor 86, and also stores data 89 that is used by the program 88.

The user 21 can interact with the site manager 71. For example, the site manager 71 may include a not-illustrated terminal, and the user 21 may be an individual who interacts with the site manager through that terminal. The network 18 is operatively coupled to a network port of the site manager 71. The network 18 may include one or more of the Internet, an intranet, some other type of computer network, or a combination of two more such networks. The users 22 and 23 can communicate with the site manager 71 through the network 18. The users 22 and 23 may, for example, be individuals who are using personal computers or other terminals that are coupled to the network 18. Alternatively, the users 22 and 23 may be automated systems that are operatively coupled to the network 18. For example, the user 22 could be a site manager that is similar to the site manager 71, but that is located in a different site at a physically remote location.

As evident from the foregoing discussion, the tag 16 and the interrogators 12 and 13 each include both hardware and software (where the software may include firmware). In the embodiment of FIG. 1, the hardware in the interrogators 12 and 13 and in the tag 16 is entirely conventional. The new and unique characteristics discussed herein are embodied in the software, including the programs 43, 58 and 88 executed by the various processors in the tag 16 and interrogators 12 and 13. The new and unique characteristics in the program 88 of the interrogator 12 are essentially the same as those in the program 58 of the interrogator 13. Accordingly, for simplicity and to avoid redundancy, the discussion that follows will focus on the distinctive characteristics of the program 88 in the interrogator 12, as well as the distinctive characteristics of the program 43 in the tag 16. But before beginning a detailed discussion of the new and unique characteristics of the programs 88 and 43, it will be helpful to first briefly discuss the computer programs used in a conventional interrogator and tag.

Figure 2:
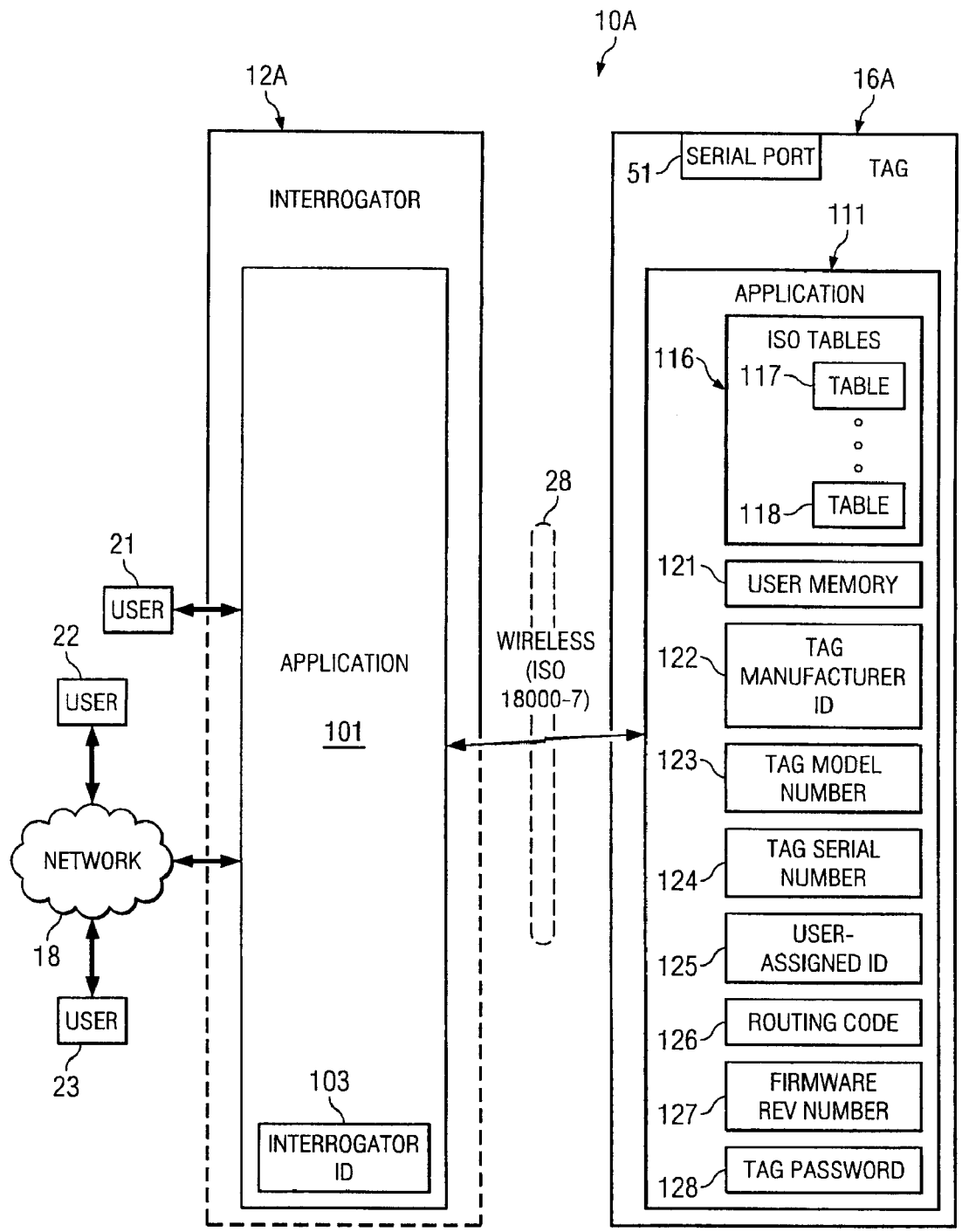
FIG. 2 is a block diagram of a conventional RFID system in which an interrogator and a tag exchange wireless communications conforming to an industry standard known as ISO 18000-7.

In this regard, FIG. 2 is a block diagram of a system 10A that includes an interrogator 12A and a tag 16A that can exchange wireless communications 28 conforming to the ISO 18000-7 standard. In FIG. 2, components that are the same as or similar to components in FIG. 1 are identified with the same or similar reference numerals. For the purpose of this discussion, it is assumed that the hardware of the interrogator 12A of FIG. 2 is identical to the hardware of interrogator 12 of FIG. 1, and that the differences between these interrogators reside in the computer programs within them. Similarly, it is assumed that the hardware of the tag 16A of FIG. 2 is identical to the hardware of the tag 16 of FIG. 1, and that the differences between these tags reside in the computer programs within them. In FIG. 1, the subject matter depicted within the interrogator 12 and within the tag 16 represents primarily a high-level view of their hardware configurations. In contrast, in FIG. 2, the subject matter depicted within the interrogator 12A and within the tag 16A represents selected high-level aspects of the computer programs within the interrogator 12A and tag 16A.

In more detail, with reference to FIG. 2, the computer program in the interrogator 12A includes an application program 101. The data maintained by the application program 101 includes an interrogator identification code 103 that uniquely identifies the particular interrogator 12A. As mentioned earlier, a given site may include multiple interrogators and multiple tags, such that a given tag may be carrying on communications with more than one interrogator, and a given interrogator may be carrying on communications with more than one tag. Accordingly, when the interrogator 12A transmits a wireless ISO message at 28, the interrogator includes in the message its interrogator identification code 103, so that any tag receiving that message will know which particular interrogator sent the message.

The computer program executed in the tag 16A includes an application program 111. The application program 111 maintains a database of ISO tables 116, and examples of two ISO tables are shown diagrammatically at 117 and 118. The application program 111 includes a segment of user memory 121, and maintains a tag manufacturer identification code 122 that uniquely identifies the company that manufactured the tag 16A. The application program 111 also maintains a tag model number 123 corresponding to the tag 16A, and a tag serial number 124 that is unique to the particular tag 16A. The application program 111 further maintains a user-assigned identification code 125 that can be set and/or read by an external user, such as one of the users 21-23.

In addition, the application program 111 maintains a routing code 126. For example, if the tag 16A happen to be mounted on a container that is being shipped from a manufacturer to a remote shipping hub, and then from the shipping hub to a customer, the routing code 126 may be a code that identifies the particular shipping route. The application program 111 also contains a firmware revision number 127 identifying the particular version of the software/firmware computer program that is currently installed in the tag 16A. Further, the application program 111 maintains a tag password 128. If password protection in the tag is enabled, and if one of the users 21-23 wishes to communicate with the tag, then the user will first need to supply the tag with the correct password.

Figure 3:
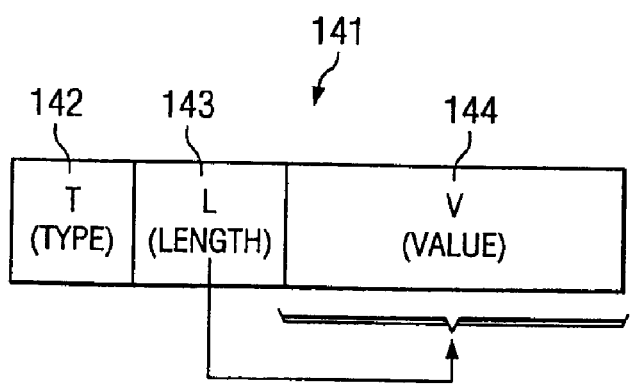
FIG. 3 is a diagram showing a data format used within the ISO 18000-7 standard.

As discussed above, the interrogator 12A and the tag 16A exchange wireless communications 28 that conform to the ISO 18000-7 industry standard. FIG. 3 is a diagram showing one common data format 141 that is used within ISO 18000-7 messages. This data format 141 includes three fields, which are a type or "T" field 142, a length or "L" field 143, and a value or "V" field 144. Combining the first letters of the names of these fields yields the acronym "TLV", and thus the data format 141 is commonly referred to as the "TLV" format. The type field 142 contains a code that uniquely identifies the type of data present in the value field 144. The length field 143 defines the length the value field 144, and in particular contains a number that represents the number of bytes present in the value field 144. The value field 144 contains one or more data elements (and each such data element may itself also have the TLV format). Persons skilled in the art are thoroughly familiar with the TLV data format shown in FIG. 3.

Figure 4:
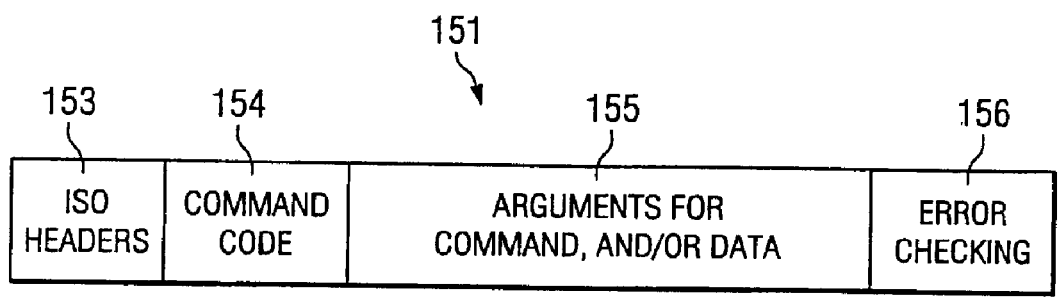
FIG. 4 is a diagram showing a highly-generalized message format used under the ISO 18000-7 standard.

Referring again to FIG. 2, and as explained earlier, wireless messages 28 exchanged between the interrogator 12A and the tag 16A conform to the ISO 18000-7 standard. These ISO messages can have a variety of different formats. These formats are all defined in detail in the ISO 18000-7 specification, and they are therefore not all illustrated and described here in detail. Instead, FIG. 4 is a diagram showing a highly-generalized format 151 that is used for many types of ISO messages under the ISO 18000-7 standard. The message format 151 includes a section 153 of ISO headers, which is a collection of several different fields. The particular set of fields that are present at 151 will vary somewhat from message to message. For example, the ISO headers 153 always include a not-illustrated protocol identification field. The ISO headers 153 will typically also include the interrogator identification code 103 (FIG. 2) when the message is being transmitted by the interrogator 12A, but not if the message is transmitted by the tag 16A. Conversely, the ISO headers 153 will typically include the tag serial number 124 (FIG. 2) if the message is being transmitted by the tag 16A, but not if the message is being transmitted by the interrogator 12A. There are other fields that can also be present in the ISO headers 153, but since they are well known in the art, they are not all discussed in detail here.

The format 151 also includes a command code 154 to tell a receiving device what it is expected to do, a field 155 containing data and/or arguments for the command code 154, and an error checking field 156. The error checking field 156 typically contains a cyclic redundancy code (CRC) of a known type.

In regard to the command code shown at 154 in FIG. 4, Table 1 gives examples of some commands that the interrogator 12A of FIG. 2 can send to the tag 16A. It will be noted that some of these commands allow the interrogator 12A to read or write the user-assigned identification code 125 (FIG. 2), the routing code 126, or the user memory 121. Other commands allow the interrogator 12A to read the firmware revision number 127, or the tag model number 123. Still other commands allow the interrogator 12A to change the tag password 128, and to engage or disengage password protection. Still other commands allow the interrogator 12A to create a table within the database 116 of ISO tables, to write information into a table, or to read information from a table. Another command instructs the tag to enter a low-power "sleep" mode in which most (but not all) of the circuitry in the tag is turned off in order to conserve battery power. Still another command turns on or off a not-illustrated audible beeper that is located within the tag. Table 1 does not list all of the commands that exist under the ISO 18000-7 standard, but merely gives examples of some of those commands.

TABLE 1

| COMMAND CODE | COMMAND NAME | DESCRIPTION |
| --- | --- | --- |
| 0x15 | Sleep | Put tag to sleep |
| 0x13 | User ID | Read user-assigned ID |
| 0x93 | User ID | Write user-assigned ID |
| 0x09 | Routing Code | Read routing code |
| 0x89 | Routing Code | Write routing code |
| 0x0C | Firmware Revision | Retrieve firmware revision number |
| 0x0E | Model Number | Retrieve tag model number |
| 0x60 | Read/Memory | Read user memory |
| 0xE0 | Write Memory | Write user memory |
| 0x95 | Set Password | Set tag password |
| 0x17 | Set Password protect | Engage password protection |
| 0x97 | Set Password protect | Disengage password protection |
| 0x96 | Unlock | Unlock password protected tag |
| 0x70 | Read Universal Data Block | Read Universal Data Block |
| 0x26 | Table Create | Create database table |
| 0x26 | Table Add Records | Prepare to add new records to specified database table |
| 0x26 | Table Update Records | Prepare to modify specified table records |

TABLE 1-continued

| COMMAND CODE | COMMAND NAME | DESCRIPTION |
|---|---|---|
| 0x26 | Table Update Fields | Prepare to update specified fields of a table record |
| 0x26 | Table Delete Record | Delete existing record from existing database table |
| 0x26 | Table Get Data | Prepare to retrieve specified table records |
| 0x26 | Table Get Properties | Get total number of records and size of each field |
| 0x26 | Table Read Fragment | Retrieve block of data from table, as initiated by Table Get Data command |
| 0x26 | Table Write Fragment | Write block of data into table, as initiated by Table Add Records, Table Update Records, or Table Update fields command |
| 0x26 | Table Query | Initiate table search based on specified criteria |
| 0xE1 | Beep On/Off | Turns tag's beeper On or Off |
| 0x8E | Delete Writeable Data | Delete all allocated writeable data on tag |

In the discussion that follows, messages that are sent from the interrogator 12A to the tag 16A and that involve security fall generally within one of three different categories. First, even when a number of the tags are present, the interrogator 12A can select any one of the tags and send a message specifically to that one particular tag, and then expect a single response from that tag. This type of message is known as a Point-2-Point or "P2P" message.

In a second category of messages, the interrogator 12A can broadcast a single message to all of the security-enabled tags that are currently within the wireless transmission range of that particular interrogator. As one example, the interrogator can send one or more ISO "table query" broadcast messages to multiple tags, followed by an ISO collection query broadcast message. The interrogator then expects a single separate response from each individual tag. Messages in this category are referred to in this discussion as table query broadcast messages.

A third category of ISO messages is referred to as universal data block or "UDB" collection. In particular, the interrogator 12A can broadcast to multiple tags a common message that instructs each tag to formulate and send back a UDB data block. Each tag then prepares a UDB data block that has a predefined format, and that typically contains multiple items of data. For example, under the ISO 18000-7 standard, the UDB data block may include tag identification information (discussed in more detail later), and/or a routing code. Under proprietary extensions, various other data items could also be present. The various data elements in the UDB are typically each presented in the TLV format discussed above in association with FIG. 3. After each tag has prepared its UDB, the tag sends its UDB back to the interrogator 12A in a wireless message 28 that conforms to the ISO 18000-7 standard.

In FIG. 2, and as mentioned above, all of the wireless messages 28 sent between the interrogator 12A and the tag 16A conform to the ISO 18000-7 standard. But one resulting disadvantage is that these messages are not secure. For example, since these messages are sent as RF communications, a third party can easily receive these messages and/or transmit similar messages, and thus eavesdrop on or interfere with communications between the interrogator 12A and the tag 16A. For example, if the tag 16A transmits a wireless message that includes a UDB with a routing code therein, a third party can receive that RF message and thus learn routing information of the tag and any associated object such as a container. what is in the container. As another example, a third-party device can emulate a tag, and the interrogator 12A will not necessarily be able to tell that it is talking to an imposter rather than an actual valid tag.

As still another example, a third-party device can emulate an interrogator and communicate with the tag 16A. The tag will not know that it is communicating with an imposter rather than an actual valid interrogator. If the tag currently has password protection disabled, the third party device will be able to read or write data present within the tag, possibly in support of a fraudulent purpose. Moreover, if a valid interrogator happens to send the tag 16A a message that includes the current password for the tag, a third-party device can receive the message and learn the password. Using the password, the third-party device will have full read and write access to the tag. Moreover, using the current password, the third-party device could even replace the current password with a new password, thereby preventing a valid interrogator from subsequently communicating with the tag.

In order to avoid these and various other similar problems, it would be desirable to have some level of security for wireless ISO messages 28 being exchanged between the interrogator 12A and the tag 16A, while still complying with the ISO 18000-7 standard. However, the ISO 18000-7 standard does not have any provision for security in the wireless messages 28, through the use of encryption or otherwise. Moreover, the ISO 18000-7 standard does not have any built-in extension mechanism that would permit the definition of proprietary messages within the protocol, such as proprietary messages with security provisions. In order to address this, one aspect of the present invention involves the provision of a high level of security for information exchanged between an interrogator and a tag, while still remaining fully compatible with the existing ISO 18000-7 standard. Moreover, this is structured so that it involves only a firmware upgrade in each interrogator and each tag, without any hardware change. Consequently, existing interrogators and tags can be relatively easily and cheaply upgraded, without the need to incur the expense of completely replacing them, or the hassle and expense of hardware alterations.

Figure 5:
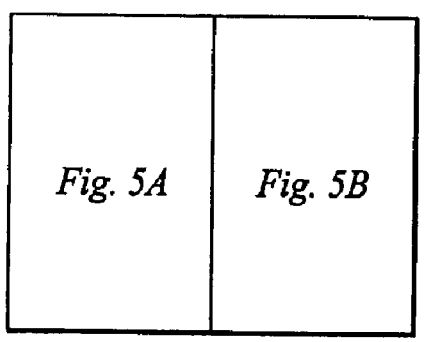
FIG. 5 is a block diagram showing a portion of the system of FIG. 1, and showing selected aspects of computer programs executed by some of the depicted components.
Figure 5A:
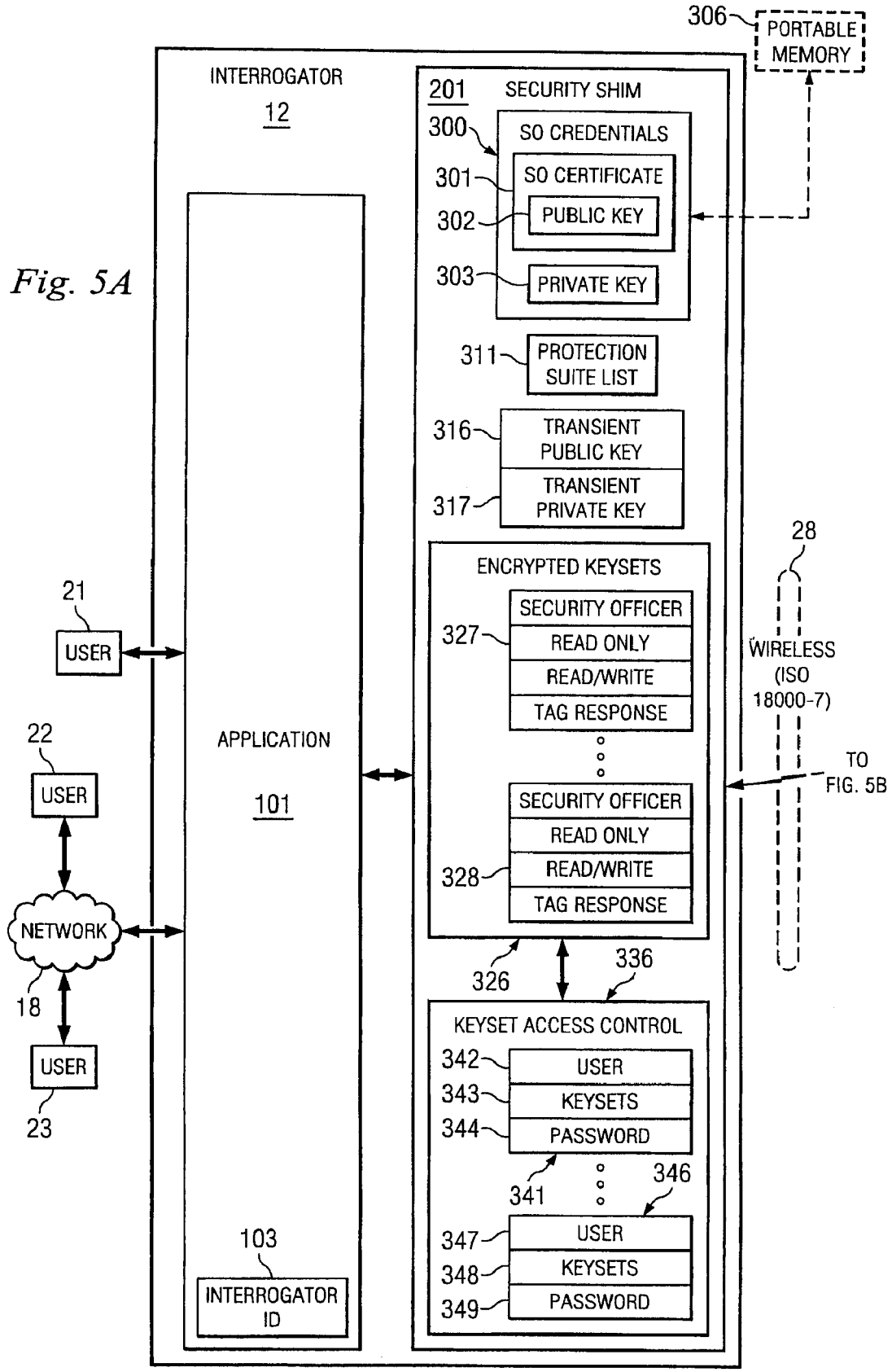
Figure 5B:
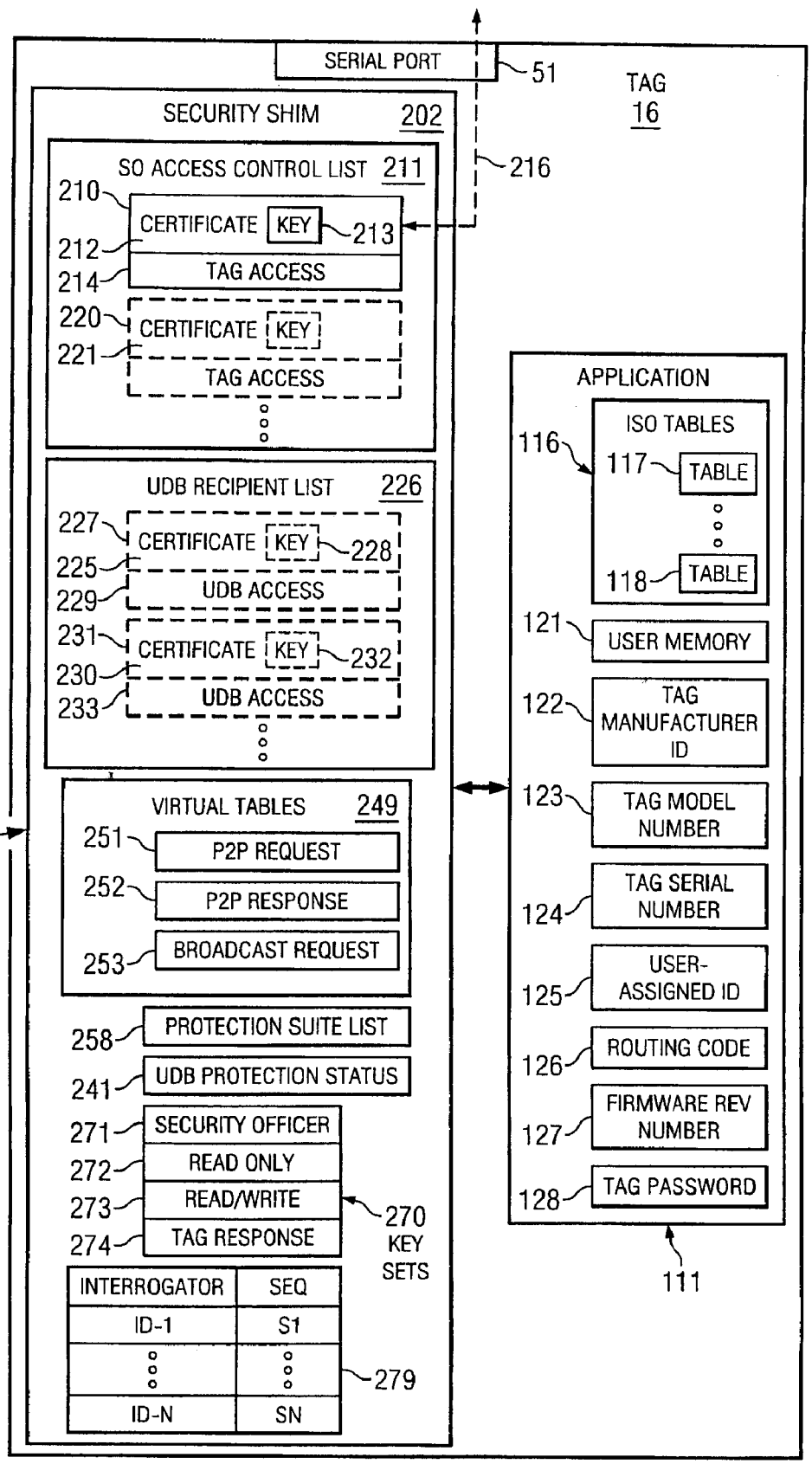

In more detail, FIG. 5 is a block diagram showing a selected portion of the system 10 of FIG. 1, including the interrogator 12, the tag 16, the network 18 and the users 21-23. As noted above, the subject matter depicted in FIG. 1 within the interrogator 12 and within the tag 16 represents primarily a high-level view of their hardware configurations. In contrast, in FIG. 5 the subject matter depicted within the interrogator 12 and the tag 16 represents selected high-level aspects of the computer programs within the interrogator and tag. In this regard, FIG. 5 is similar in some respects to FIG. 2. It will be noted that the firmware of the interrogator 12 includes the conventional application program 101 that was discussed above in association with FIG. 2, and the firmware in tag 16 includes the conventional application program 111 that was discussed above in association with FIG. 2. The primary difference between FIG. 5 and FIG. 2 is that in FIG. 5 the firmware in the interrogator 12 includes an additional module in the form of a security shim 201, and the firmware in the tag 16 includes an additional module in the form of a security shim 202.

Conceptually, the security shim 201 is disposed between the application program 101 and the wireless messages 28 that are exchanged between the interrogator 12 and the tag 16. Similarly, the security shim 202 is conceptually disposed between the application program 111 and the wireless messages 28. If the application program 101 in the interrogator 12 wishes to securely transmit an ISO message to the application program 111 in the tag 16, the security shim 201 takes that ISO message, uses encryption and authentication techniques to add a level of security, and then sends a wireless message at 28 that contains the encrypted message with authentication information, while being fully compliant with ISO 18000-7. The security shim 202 in the tag then uses decryption to recover the original ISO message, and delivers that message to the application program 111. Similarly, if the application program 111 in the tag 16 has an ISO message to be securely transmitted to the application program 101 in the interrogator 12, the security shim 202 uses encryption to add a level of security, and then transmits a wireless message at 28 that contains the encrypted message but is fully ISO 18000-7 compliant. The security shim 201 in the interrogator then uses decryption to recover the ISO message, and delivers that message to the application program 101.

The security shims 201 and 202 are effectively transparent to the application programs 101 and 111. Moreover, even though the ISO messages exchanged at 28 in FIG. 5 differ in some respects from the messages that would be exchanged if the security shims 201 and 202 were not present, the messages exchanged at 28 are nevertheless all fully compliant with ISO 18000-7. Thus, the security shims 201 and 202 are transparent from the perspective of ISO compliance, because the messages 28 do not violate any of the requirements of the ISO 18000-7 standard.

Some of the information maintained by each of the security shims 201 and 202 will now be briefly identified. Then, an explanation will be provided as to how this information is used during system operation. Beginning with the security shim 202 in the tag 16, the security shim 202 maintains a security officer access control list 211. Whenever the tag is operational, the list 211 will include at least one security officer access control object 210 that in turn includes a digital certificate 212 known as the "root" certificate. The root certificate 212 contains a PKI public key 213. In the disclosed embodiment, the certificate 212 is a type of digital certificate conforming to an industry standard that is known as the X.509 standard, promulgated by the International Telecommunication Union (ITU) based in Geneva, Switzerland. Since this type of X.509 certificate is known in the art, it is not described here in detail.

In addition to the X.509 certificate 212, the access control object 210 includes tag access information 214 that defines the level of access that will be permitted to the tag 16 through use of the associated X.509 certificate. In a sense, the tag access information 214 can be viewed as a set of rules that govern access to the tag. In this regard, the security scheme implemented by security shims 201 and 202 recognizes four distinct levels of access to a tag, which are listed in Table 2.

TABLE 2

| ROLE | DESCRIPTION |
| --- | --- |
| Tag Owner | Installs on tag the access control object containing the root certificate, and distributes corresponding certificates to security officer(s). |

TABLE 2-continued

| ROLE | DESCRIPTION |
| --- | --- |
| Security Officer | Can provision cryptographic keysets on tag, and distribute them to authorized persons and entities. Can install and remove additional security officer access control objects on tag. Can install and remove UDB access control objects. |
| Administrator | Receives keysets that allow read-only and also read/write access to tag. |
| Operator | Receives keysets that allow just read-only access to tag. |

In Table 2, the lowest level of access is that of an "operator", who has only read-only access to information on the tag. The next higher level of access is that of an "administrator", who has read-only access, and also read/write access. The next higher level is that of a "security officer", who can take security-related actions in the tag that will be described later, such as creating cryptographic keysets, and installing and removing digital certificates (other than the root certificate 212). The highest level of access is that of the tag owner, who has the power to install and remove the access control object 210 containing the root certificate 212. This may, for example, be effected through the serial port 51, as indicated diagrammatically by a broken line 216. IN fact, the overall degree of security is enhanced where operators, administrators and security officers carry out secure communications in one manner (for example through wireless communications), while the access control object 210 containing the root certificate 212 is installed in a different manner (for example through the serial port 51).

The tag access information at 214 indicates the maximum levels of access that can be obtained with the associated digital certificate 212. In this regard, the tag access information 214 indicates whether the associated digital certificate can be used to create keysets for read-only access, and whether the associated certificate can be used to create keysets for read/write access. In the case of the root certificate 212, it will normally be permissible to create keysets for read-only access and keysets for read/write access. This does not mean that everyone obtaining access with keysets created under this certificate will necessarily enjoy full access. For example, as discussed above in regard to Table 2, a person using operator keysets created under this certificate will be limited to read-only access, even if the tag access information indicates that read/write access is permissible. On the other hand, if the tag access information 214 indicates that read/write access is not permitted, then it will not be possible to create keysets under the associated certificate that would provide read/write access.

It is possible for a security officer using a security officer keyset created under one certificate (such as the root certificate 212) to optionally install one or more additional access control objects in the list 211, for example as shown at 220. The tag access information for one of these other access control objects might indicate that creation of read-only keysets under the associated certificate 221 is permitted, but that creation of read/write keysets under that further certificate is prohibited. If a security officer is using a security officer keyset created under an existing certificate in an existing access control object, and installs a further access control object, the tag access rights for that further object must not exceed the tag access rights in the existing object under which the security officer keyset was created.

The security shim 202 also maintains a further list 226 that is a universal data block (UDB) recipient list. The list 226 may be empty, or may optionally contain one or more UDB access control objects. For example, reference numeral 227 designates a UDB access control object containing a digital certificate 225 of a UDB recipient. In the disclosed embodiment, the UDB certificate 225 is an X.509 certificate, and contains a PKI public key 228. The UDB access control object 227 further includes UDB access information 229. The list 226 may optionally include a second UDB access control object 231 containing a digital certificate 230 with a public key 232, and UDB access information 233. It would be possible to combine the lists 211 and 226 into a single list that contains both types of access control objects. But for clarity in this discussion, two separate lists 221 and 226 are shown and described. In a sense, the UDB access information 229 and the UDB access information 233 can each be viewed as a set of rules that govern access to UDB information, as discussed below.

When the tag 16 receives an ISO message asking that the tag formulate and return a UDB, the UDB access control objects in the list 226 identify the persons or entities who will be the ultimate recipients of the tag's UDB information. In response to the ISO message presenting the UDB request, the application program 111 in the tag 16 collects all of the UDB information that is present within the tag. The security shim 202 in the tag intercepts this UDB information from the application program 111, uses the UDB access control objects in the list 226 to identify UDB recipients, and prepares a respective separate block of UDB data for each UDB recipient identified by the UDB access control objects 227 and 231 in the list 226. The security shim 202 does not necessarily pass all of the UDB information on to each of the recipients identified by the respective access control objects in the list 226. Instead, the UDB access information 229 or 233 in each access control object defines which items of UDB information will be received by the associated recipient.

Figures 6, 7:
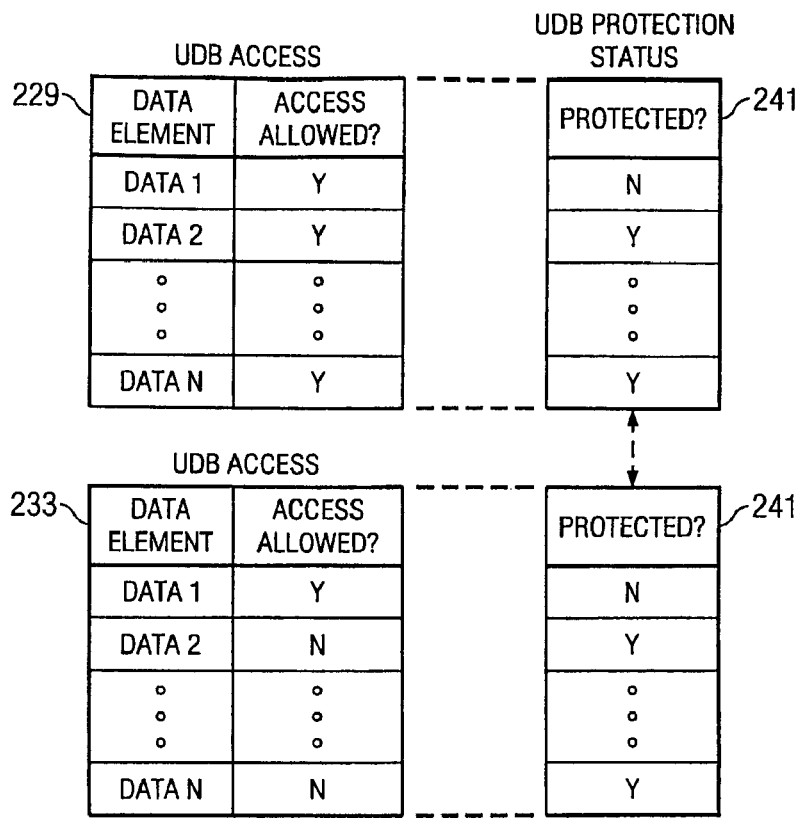
FIG. 6 is a diagram showing in more detail certain information maintained and used in the system of FIG. 5.
FIG. 7 is a table showing examples of five protection suites used within the system of FIG. 5, each protection suite being a combination of an encryption technique and an authentication technique.

For example, assume that the UDB information provided by the application program 111 is a set of N data elements Data 1 through Data N. Data 1 might be tag identification information, Data 2 might be a routing code, and Data N might be some other type of data. FIG. 6 is a diagram showing the UDB access information 229 associated with the UDB access control object 227, and also the UDB access information 233 associated with the UDB access control object 231. It will be noted that the UDB access information 229 associated with access control object 227 indicates the associated recipient is permitted to receive each of data elements Data 1, Data 2, and Data N (and possibly other UDB data elements that are between Data 2 and Data N). In contrast, the access information 233 associated with access control object 231 indicates the associated recipient is entitled to receive data element Data 1 (and possibly other data elements between Data 2 and Data N), but not data element Data 2 or data element Data N.

With reference to FIG. 5, the security shim 202 also maintains UDB protection status information 241. This information identifies the data elements in the tag's UDB information that will be protected by encryption and authentication, and the data elements that will not be protected. Referring again to FIG. 6, the UDB protection status information 241 is depicted twice, once in association with UDB access information 229, and again in association with UDB access information 233. In the exemplary embodiment, the UDB protection status information 241 indicates that data elements Data 2 and Data N will be protected, but that data element Data 1 will not be protected.

Since the UDB access information 229 indicates that the associated recipient is entitled to receive each of data elements Data 1, Data 2 and Data N, then when the security shim 202 receives UDB information from the application program 111 (including data elements Data 1 through Data N), the security shim 202 will formulate a UDB block for that recipient which includes each of Data 1, Data 2 and Data N (and possibly other data elements between Data 2 and Data N). Further, since UDB protection status 241 indicates that Data 2 and Data N need to be protected, the security shim 202 would encrypt data elements Data 2 and Data N. More specifically, the security shim 202 would generate a random key, use the random key to separately encrypt each of Data 2 and Data N, and then encrypt the random key with that recipient's public key 228.

Similarly, since the UDB access information 233 for the other UDB access control object 231 indicates that the associated recipient is entitled to receive data element Data 1 but not data elements Data 2 and Data N, then when the security shim 202 receives UDB information from the application program 111, the security shim 202 will formulate a UDB block for that recipient which includes Data 1 (and possibly other data elements between Data 2 and Data N), but not data elements Data 2 and Data N. The UDB protection status information 241 indicates that data elements Data 2 and Data N need to be protected, but this recipient is not receiving those data elements. This recipient is receiving data element Data 1, but the UDB protection status information 241 indicates that data element Data 1 does not need to be protected. Therefore, data element Data 1 would not be encrypted.

As discussed earlier, the application program 111 maintains a database 116 of ISO 18000-7 tables, and examples of two of these tables are shown at 117 and 118. The security shim 202 maintains a database 249 of three virtual ISO tables, which are a P2P Request Table 251, a P2P Response Table 252, and a Broadcast Request Table 253. These are referred to as virtual tables, because the application program 111 of the tag is not aware they exist. There are standard ISO commands that can be used to access ISO tables in the database 116, and the security shim 201 can use these same standard ISO commands to access the virtual ISO tables 251-253, as discussed in more detail later.

The security techniques used by the security shims 201 and 202 involve both (1) a cryptographic technique used to encrypt and decrypt information, and (2) an authentication technique used to authenticate information received in wireless ISO messages 28. The security shims 201 and 202 are each capable of working with any of several different cryptographic techniques, and with any of several different authentication techniques. A combination of one particular encryption technique and one particular authentication technique is referred to herein as a "protection suite". The security shim 202 maintains a list 258 of the protection suites with which it is compatible. FIG. 7 is a table showing examples of five protection suites, which are the protection suites with which the security shim 202 is compatible. These five protection suites are merely exemplary, and it would be possible for the list 258 to contain a larger or smaller number of protection suites. It will be noted that the last protection suite in FIG. 7 is a NULL-NULL protection suite that does not use either encryption or authentication. This particular suite is utilized for a special purpose that is discussed in more detail later. The protection suite list 258 in the security shim 202 will always include the NULL-NULL protection suite, along with at least one other protection suite.

Referring again to FIG. 5, the security shim 202 maintains a keyset table 270 that can store four different cryptographic keysets 271-274. With reference to FIG. 5 and Table 2, the keyset 271 is a security officer (SO) keyset that can be used by a security officer when reading information from or writing information to the tag 16. Thus, the keyset 271 can be said to be bidirectional, in that it can be used for messages sent to the tag and also messages sent by the tag. The keyset 272 is a read-only keyset, and is used for messages that are sent to the tag by anyone other than a security officer, and that do not seek to change any information within the tag. The keyset 272 is unidirectional, in that it is used only for messages sent to the tag, and not for any messages sent by the tag. The keyset 273 is a read/write keyset, and can be used for messages that are sent to the tag by anyone other than a security officer, and that seek to change information within the tag. The keyset 273 is unidirectional, in that it is used only for messages sent to the tag, and not for any messages sent by the tag. The keyset 274 is a tag response keyset, and is used for messages sent by the tag to anyone other than a security officer. The keyset 273 is unidirectional, in that it is used only for messages sent by the tag, and not for any messages sent to the tag.

Still referring to FIG. 5 and Table 2, a person or entity with operator status would be given the read-only keyset 272 and also the tag response keyset 274. A person or entity with administrator status would be given the read-only keyset 272, the read/write keyset 273, and the tag response keyset 274. A security officer would use the security officer keyset 271 to carry out certain tasks specific to security officers.

Table 3 is an expanded version of Table 1, showing examples of some ISO commands for which the read-only keyset 272 is used, and examples of other ISO commands for which the read/write keyset 273 is used. The commands in Table 3 are merely exemplary, because Table 3 does not show all ISO commands. Where the tag replies to any command in Table 3, the tag would use the tag response keyset 274.

TABLE 3

| COMMAND CODE | COMMAND NAME | DESCRIPTION | APPLICABLE KEYSET |
|---|---|---|---|
| 0x15 | Sleep | Put tag to sleep | Read/Write |
| 0x13 | User ID | Read user-assigned ID | Read-only |
| 0x93 | User ID | Write user-assigned ID | Read/Write |
| 0x09 | Routing Code | Read routing code | Read-only |
| 0x89 | Routing Code | Write routing code | Read/Write |
| 0x0C | Firmware Revision | Retrieve firmware revision number | Read-only |
| 0x0E | Model Number | Retrieve tag model number | Read-only |
| 0x60 | Read/Memory | Read user memory | Read-only |
| 0xE0 | Write Memory | Write user memory | Read/Write |
| 0x95 | Set Password | Set tag password | Read/Write |
| 0x17 | Set Password protect | Engage password protection | Read/Write |
| 0x97 | Set Password protect | Disengage password protection | Read/Write |
| 0x96 | Unlock | Unlock password protected tag | Read/Write |
| 0x70 | Read Universal Data Block | Read Universal Data Block | Read-only |
| 0x26 | Table Create | Create database table | Read/Write |
| 0x26 | Table Add Records | Prepare to add new records to specified database table | Read/Write |
| 0x26 | Table Update Records | Prepare to modify specified table records | Read/Write |
| 0x26 | Table Update Fields | Prepare to update specified fields of a table record | Read/Write |
| 0x26 | Table Delete Record | Delete existing record from existing database table | Read/Write |
| 0x26 | Table Get Data | Prepare to retrieve specified table records | Read-only |
| 0x26 | Table Get Properties | Get total number of records and size of each field | Read-only |
| 0x26 | Table Read Fragment | Retrieve block of data from table, as initiated by Table Get Data command | Read-only |
| 0x26 | Table Write Fragment | Write block of data into table, as initiated by Table Add Records, Table Update Records, or Table Update fields command | Read/Write |
| 0x26 | Table Query | Initiate table search based on specified criteria | Read-only |
| 0xE1 | Beep On/Off | Turns tag's beeper On or Off | Read/Write |
| 0x8E | Delete Writeable Data | Delete all allocated writeable data on tag | Read/Write |

As discussed earlier, FIG. 5 shows only a single interrogator 12 and a single tag 16, but it is possible for the tag 16 to carry on communications with more than one interrogator at the same time. The security shim 202 in the tag 16 maintains a table 279 that contains a record for each interrogator with which the tag is currently communicating. Each such interrogator is identified in the left column of the table by its interrogator identification code 103. For each such interrogator, the right column of the table 279 contains a sequence number. In this regard, any given interrogator may transmit a series of ISO wireless messages to the tag 16, and each of these messages will contain a sequence number, as discussed later. For each interrogator, the table 279 contains the sequence number from the message most recently received from that interrogator. Each time the tag receives a message from that interrogator, the security shim 202 checks to see whether the sequence number in the new message is greater than the sequence number currently stored in the table 297 for that interrogator. If the sequence number from the new message is equal to or less than the number in the table, then the security shim flags an error. Otherwise, the security shim accepts the new message, and replaces the sequence number in the table 279 with the sequence number from the new message.

Turning now to the security shim 201 in the interrogator 12, FIG. 5 shows that the security shim 201 includes security officer credentials 300, the credentials 300 including a security officer (SO) certificate 301 containing a public key 302, and a private key 303. In this example, the SO certificate 301 corresponds to the root certificate 212 in the tag 16. In this regard, the public key 302 in the credentials 300 was generated by concatenating the public key 213 of the root certificate 212 with a public key corresponding to the private key 303 in the credentials 300, and then signing the two concatenated keys with a not-illustrated private key corresponding to the public key 213. There are various ways in which the credential 300 can be introduced into the interrogator 12. As one example, the credentials 300 could be introduced into the interrogator 12 from a portable memory device 306 of a known type, such as a Universal Serial Bus (USB) flash memory device, or a device of the type commonly known as a "smartcard".

As discussed above, a protection suite is a combination of one particular encryption technique and one particular authentication technique. The security shim 201 includes a list 311 of protection suites with which it is compatible. This protection suite list 311 is conceptually similar to the protection suite list 258 discussed earlier in association with the security shim 202 and FIG. 7. However, the set of protection suites identified in the list 311 may not necessarily be identical to the set of protection suites identified in the list 258. However, both lists will include the NULL-NULL protection suite (FIG. 7), as well as at least one other protection suite. In order for the security shims 201 and 201 to exchange secure information, the lists 258 and 311 will need to have at least one protection suite in common (other then the NULL-NULL protection suite).

The security shim 201 can generate and temporarily save a transient PKI public key 316 and a corresponding transient PKI private key 317, for a purpose discussed in more detail later. The security shim 201 also includes encrypted storage 326 that may be empty, but that will typically include one or more keyset tables, two examples of which are shown at 327 and 328. The keyset tables 327 and 328 are each similar to the keyset table 270 discussed above, which contains four keysets 271-274. For the purpose of this discussion, it is assumed that the keyset table 327 is for the tag 16 and is thus identical to the keyset table 270 in the tag 16, and that the keyset table 328 corresponds to a different tag and thus is not identical to the keyset table 270 in tag 16. However, there may be some commonality. For example, for reasons discussed later, the keyset tables 327 and 328 may each contain a read-only keyset that is identical to the read-only keyset 272 in the tag 16. In the disclosed embodiment, the encryption technique used for protecting the storage 326 is implemented with the Microsoft® Cryptographic API (CAPI) available on the Windows XP® and Windows CE® platforms (CE-CRYPTO). However, the encryption could alternatively be implemented using any other suitable encryption platform.

As mentioned above, the storage 326 is encrypted. In order to provide for restricted access to this encrypted storage 326, the security shim 201 maintains an access control section 336 that contains one or more access control blocks each corresponding to a respective different user. For example, the control section 336 contains an access control block 341 that has a user identification 342, a password 344, and an identification 343 of one or more keyset tables 327-328 that the specified user is authorized to use. Similarly, another access control block 346 has a user identification 347 that identifies a different user, a password 349 for that user, and an identification 348 of one or more keyset tables 327-328 that the user is authorized to use. When, for example, the user 342 provides the proper password 344 to the control section 336, each keyset table identified at 343 is obtained from encrypted storage 326, decrypted, and then made available for use by that user. Each user is permitted to freely change his or her password. Depending on the circumstances, and where appropriate, the security officer credentials 300 could also be maintained in protected storage, with access thereto controlled by the access control section 336.

As discussed earlier, the ISO 18000-7 standard does not have any provision for protecting ISO messages that are being transmitted. Moreover, this ISO standard does not have a built-in extension mechanism permitting the definition of new and proprietary messages that conform to the standard but that could also use encryption or some other security mechanism. Accordingly, the security shims 201 and 202 implement a unique technique that complies with the ISO 18000-7 standard but that provides strong security for ISO messages exchanged between the application program 101 in the interrogator and the application program 111 in the tag 16. According to this technique, the actual original ISO 18000-7 message is encrypted, then transmitted as a payload within at least one other ISO 18000-7 message that is not encrypted and that effectively serves as an envelope for the encrypted original message. This approach of embedding one ISO message within another is referred to herein as "tunneling" the encrypted message within the envelope message.

In more detail, and as discussed earlier, the ISO 18000-7 standard includes commands that permit the interrogator 12 of FIG. 5 to access ISO tables in the database 116, such as the exemplary tables shown at 117 and 118. The security shim 201 of the interrogator 12 uses the same ISO table commands for envelope messages, in order to access the virtual tables 251-253 in the security shim 201. Thus, if the application program 101 in the interrogator 12 has an ISO message that is to be sent to the application program 111 in the tag 16, the security shim 201 intercepts this ISO message, adds encryption and authentication, and then transmits it as the payload in at least one enveloping ISO message containing a table write fragment command directed to one of the virtual tables 251 or 253.

As a practical matter, the encrypted and authenticated command will usually be too large to be sent as the payload of a single ISO message. This is due in part to the fact that, in the United States, the Federal Communications Commission limits RFID infrastructure transmissions to 25 msec out of any 100 msec time window, which effectively limits each message to a length of about 100 bytes. Other countries and local authorities may also impose constraints. Accordingly, since the encrypted and authenticated command will usually be too large to embed within a single ISO message, it will typically be broken into several fragments, and then the fragments will be sent separately to the table 251 or 253 in respective different enveloping messages that are each an ISO table write fragment command. When all of the fragments have been written into the virtual table 251 or 253, the security shim 202 will retrieve and reassemble the fragments, authenticate and decrypt the result in order to recover the original ISO command, and then deliver this ISO command to the application program 111.

Conversely, if the application program 111 in the tag 16 has an ISO message to send to the application program 101 in the interrogator 12, the security shim 202 can intercept this ISO message, add encryption and authentication, fragment the message, and put the fragments into the virtual table 252. The security shim 202 then notifies the security shim 201, and the security shim 201 retrieves these fragments from the virtual table 252 using successive ISO table read fragment commands. That is, the fragments are each transported as the payload of a respective envelope ISO message sent in response to an ISO table read fragment command. When the security shim 201 has retrieved all of the fragments from the table 252, it reassembles the fragments and then authenticates and decrypts the result, in order to recover the original ISO message. The security shim 201 then delivers the original ISO message to the application program 101. With reference to an earlier discussion herein of different categories of messages, the virtual tables 251 and 252 are used for P2P messages and responses, and the virtual table 253 is used for broadcast table query messages.

Figure 8:
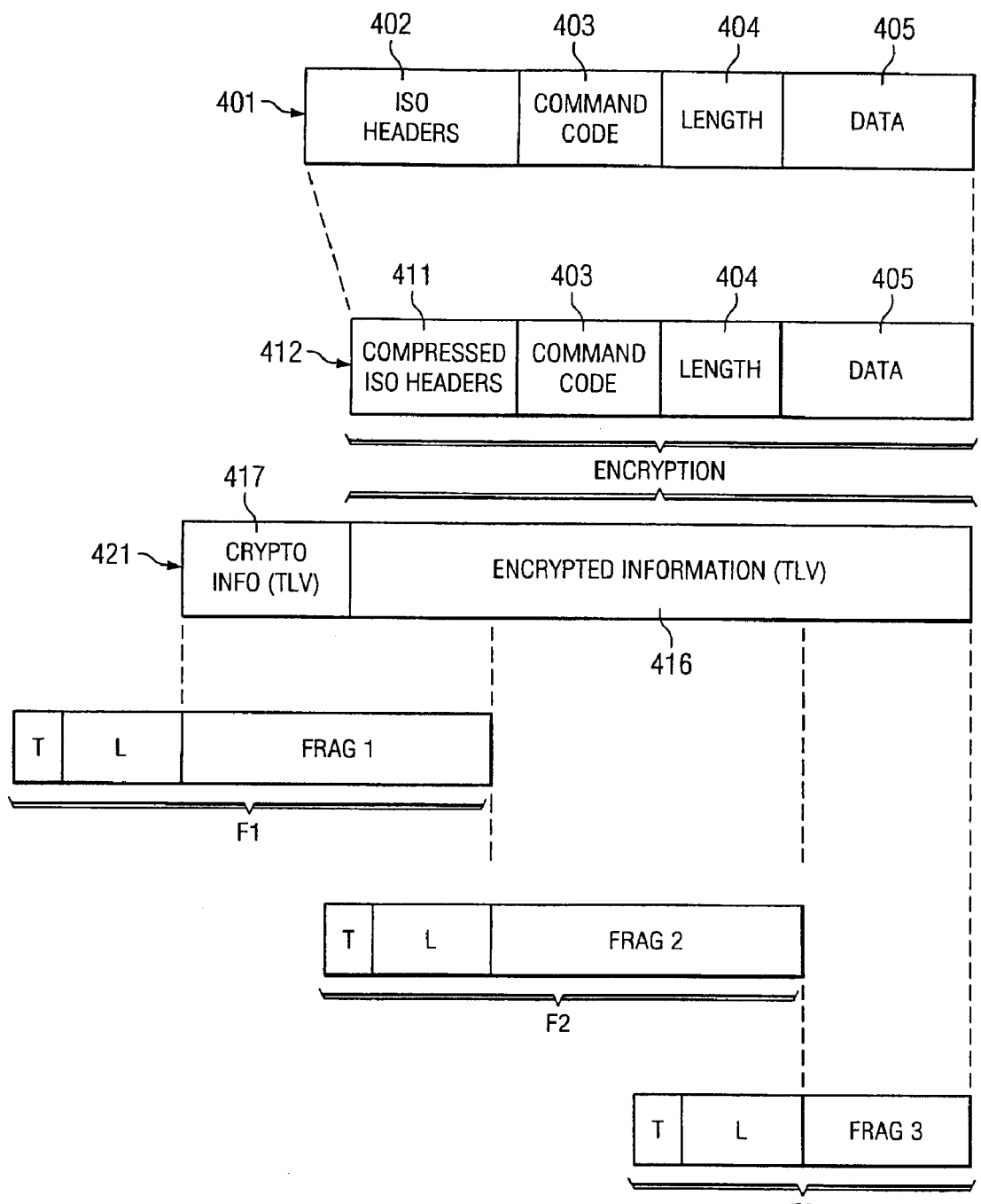
FIG. 8 is a diagram showing how an ISO 18000-7 message is compressed, encrypted and fragmented for purposes of transmission within the system of FIG. 5.

FIG. 8 is a diagram showing in more detail how this can be accomplished for an ISO 18000-7 P2P message 401 that is generated by the application program 101. The command 401 has a standard ISO format, including ISO headers 402, a command code 403, a length value 404, and data 405. In order to reduce the amount of information that must be encrypted and tunneled, some of the ISO headers 402 from the message 401 are dropped, in order to obtain a compressed version 411 of the ISO headers 402. This is shown in more detail in Table 4.

TABLE 4

| ACTION | HEADERS |
| --- | --- |
| Header would be the same in both the tunneled message and the envelope message. Omit from header of tunneled message, and then recreate at receiving end by copying from the equivalent header in the envelope message. | Packet Options<br>Tag Manufacturer ID<br>Tag Serial Number<br>Interrogator ID |
| Omit from header of tunneled message, and then recreate at receiving end by re-computing the value. | Packet Length<br>CRC |
| To protect this information, preserve this header in the tunneled message, and set the corresponding header of the envelope message to always indicate a positive response from tag. | Tag Status |

In this regard, if all of the ISO headers 402 were retained in the tunneled message, some of them would necessarily always be identical to their counterparts in the ISO headers of the envelope message. Accordingly, these headers are omitted from the tunneled message. At the receiving end, they are added back to the tunneled message by simply copying the counterparts from the envelope message. As shown in Table 4, these include well-known ISO headers such as packet options, tag manufacturer identification, tag serial number, and interrogator identification code. As another example, some of the ISO headers 402 of the tunneled message would not necessarily be identical to their counterparts in the envelope message, but can be omitted from the tunneled message, and then recreated at the receiving end by recomputing them. As shown in Table 4, these include the well-known ISO headers of packet length and CRC error checking.

One other ISO header of interest is the tag status header. This header is maintained without change in the tunneled message. In theory, the counterpart header in the envelope message could be identical. However, this status information in the header of the envelope message would then be publicly accessible to anyone within the transmission range of the tag. In order to avoid making this status information available to anyone other than the intended recipient(s), and as indicated in Table 4, the ISO tag status header in each envelope message is unconditionally set to indicate a positive status response from the tag, regardless of whether the tag status header in the tunneled message happens to be positive or negative. Consequently, other parties who may look at the envelope message will always see it reflecting a positive tag status, and will not know whether the actual tag response was positive or negative.

Referring again to FIG. 8, reference numeral 412 identifies the compressed version of the original ISO message 401. As between any pair of transmitting and receiving devices, a selected common protection suite will be in effect. As discussed above, that protection suite will identify both an encryption technique and an authentication technique. In addition, between that same pair of devices, it will be possible to identify an appropriate cryptographic keyset which, depending on the circumstances, may be the security officer keyset 271, the read-only keyset 272, the read/write keyset 273, or the tag response keyset 274. The compressed ISO message 412 is encrypted using the appropriate keyset and using the encryption technique specified in the selected protection suite (unless the suite specifies NULL rather than an encryption technique). The resulting encrypted information 416 is expressed in TLV format.

Figures 9, 10:
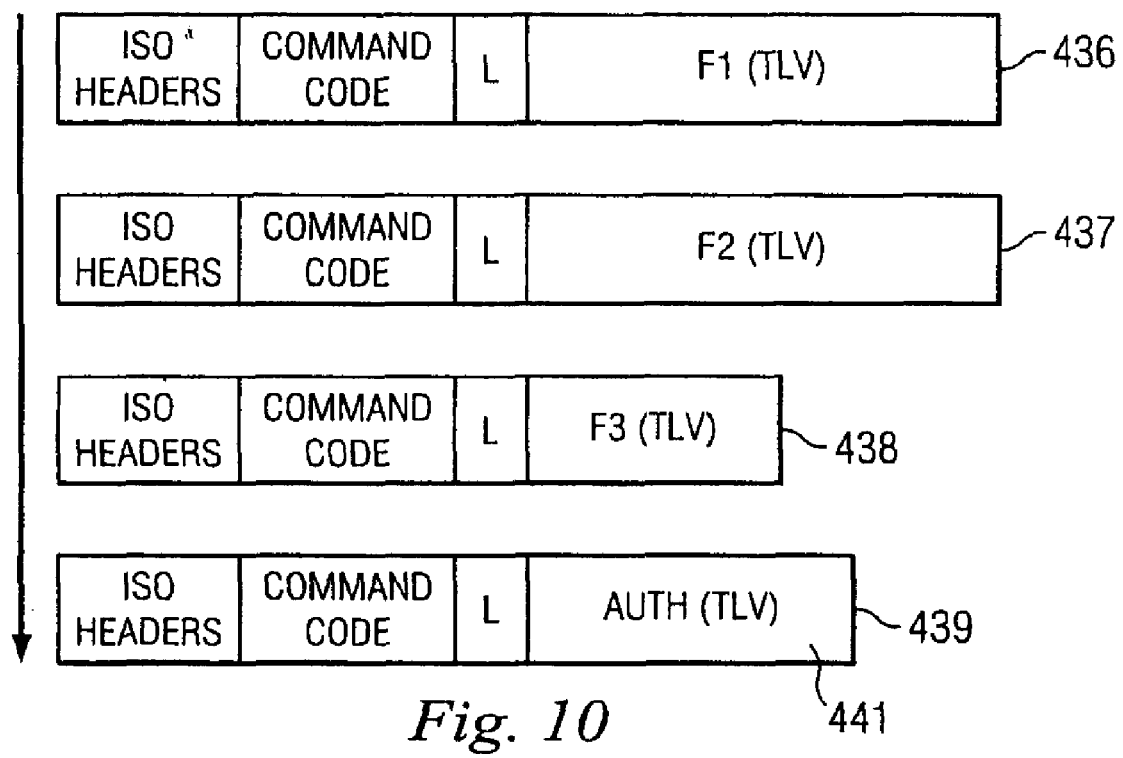
FIG. 9 shows a data storage format that is used for certain cryptographic information within the system of FIG. 5.
FIG. 10 is a diagram showing four ISO 18000-7 envelope messages that can be used in the system of FIG. 5 to transmit fragments of another ISO 18000-7 message.

Next, a cryptographic information TLV 417 is concatenated to the encrypted information TLV 416. The cryptographic information TLV is not itself encrypted, but indicates how the information 416 was encrypted, including an identification of the particular protection suite used and the particular keyset used. FIG. 9 is an example of how the cryptographic information TLV 417 would appear if the selected protection suite was the AES-128-CTR-HMAC-SHA1-96 suite of FIG. 7. The cryptographic information TLV 417 and the encrypted information TLV 416 represent the protected payload 421 that is to be transmitted. This payload will usually be too long to be sent in a single ISO envelope message. Therefore, the protected payload 421 is typically fragmented in a way that minimizes the number of fragments that must be separately sent. In the example shown in FIG. 8, this results in three fragments FRAG1, FRAG2, and FRAG3. Each fragment is then expressed in TLV form, in order to obtain three fragment TLVs F1, F2, and F3, which will each be sent in a respective separate ISO envelope message.

FIG. 10 is a diagram showing four ISO envelope messages 436-439, each of which contains a table write fragment command directed to the virtual table 251 in FIG. 5. The ISO messages 436-438 each include a respective one of the fragment TLVs F1, F2, and F3. The fourth ISO message 439 contains a TLV 441 with authentication information. The authentication information 441 includes a sequence number, and also a checksum value that will be explained later. With respect to the sequence number, and according to the ISO 18000-7 standard, the original ISO message 401 (FIG. 8) contains a sequence number. This sequence number from the original ISO message 401 is the sequence number in the authentication information 441 of the ISO message 439.

It is well known in the art how, under the ISO standard, several ISO table write fragment commands such as those shown at 436-439 in FIG. 10 can be used to write respective fragments of related information into a table such as the P2P Request Table 251 in FIG. 5. Therefore, this technique is not described in detail here. Instead, it is discussed only briefly, to an extent that facilitates an understanding of aspects of the present invention.

To initiate the process, the security shim 201 of the interrogator 12 transmits to the tag 16 a not-illustrated ISO table update record command, which serves as a request for permission to update the table 251. The security shim 202 of the tag 16 then sends back an ISO message containing a value that is commonly referred to as an operation initiation token. This and other similar tokens are random values, which adds to the security of a given message exchange. The interrogator 12 then sends the ISO message 436 in order to put the fragment TLV F1 in the table 251, and the tag responds by transmitting an ISO message with an operation continuation token. The interrogator then transmits the ISO message 437, and receives back an ISO message with a further continuation token. The interrogator then transmits the ISO message 438, and receives back another ISO message with a continuation token. The interrogator then transmits the ISO message 439. The checksum in the authentication TLV 441 of the message 439 is computed by concatenating all messages that have been exchanged between the interrogator and the tag, beginning with the initial table update record message, and including all messages sent by the tag with continuation tokens, as well as the final message 439, except for the authentication portion of the final message 439. This authentication checksum is computed according to the authentication technique indicated in the protection suite identified by the cryptographic information TLV 421 (FIG. 8), and using the appropriate keyset.

When all of the ISO 18000-7 messages 436-439 have been received by the tag and are present in the table 252, the security shim 202 in tag 16 takes the sequence number from the authentication information 441 in the final message 439, and compares that sequence number to the sequence number currently stored in the table 279 for the interrogator 12. If the sequence number from the message 439 is less than or equal to the sequence number currently stored in the table 279, the security shim 202 flags an error. Otherwise, the security shim 202 replaces the sequence number in table 279 with the new sequence number from the authentication information in message 439. Then, the security shim 202 locally computes its own authentication checksum, and compares it to the authentication checksum received in the authentication information 441 of the message 439, in order to confirm that the checksums are identical. If the tag detects an error at any time during the exchange of messages, then the tag sends the interrogator an ISO 18000-7 error message of a known type. Upon receiving this error message, the security shim 201 in the interrogator 12 discontinues the transmission, and notifies the application program 101 about the error.

On the other hand, if the security shim 202 in the tag has not identified any errors, and if the authentication checksum is verified successfully, then the security shim 202 (1) reassembles the fragments F1, F2, and F3, (2) decrypts this reassembled information, and (3) replaces or recreates the missing ISO headers, in order to thereby end up with the original message that is shown in 401 at FIG. 8. The security shim 202 then delivers this ISO message 401 to the application program 111 in the tag 16.

In response to the command in the ISO message 401, the tag will send a response back to the interrogator. This response is handled in a manner that is only slightly different from the manner described above for the message 401. In particular, the application program 111 in the tag 16 formulates an ISO message containing its response. Then, in a manner similar to that shown in FIG. 8, the security shim 202 compresses the ISO headers, encrypts the result, adds a cryptographic information TLV, and puts the resulting fragment TLVs in the P2P Response Table 252. The tag then sends the interrogator an ISO message containing a special token that indicates to the security shim 201 in the interrogator that a secure response is ready, and waiting to be retrieved. This prompts the interrogator to read the fragment TLVs from the table. For the most part, the manner in which this is carried out is known under the ISO 18000-7 standard, and the retrieval of the fragments is therefore described only briefly here.

In response to the token from the tag, the interrogator sends back an ISO message containing an ISO table get data command, and the tag responds with an operation initiation token that is a random value. The interrogator then sends an ISO table read fragment command to the tag, and the tag sends back an ISO message containing the first fragment and a further random token. The interrogator then requests the next fragment, and so forth. After the tag sends the last actual fragment, and in response to the next table read fragment request from the interrogator, the tag sends an ISO message that contains a sequence number and an authentication checksum. The authentication checksum is computed by concatenating all messages exchanged between the interrogator and tag, beginning with the message containing the initial token sent by the tag upon completing preparation of its response, and ending with the tag's final message containing the authentication checksum, except for the checksum itself. During the exchange of messages that transmit the tag's response to the interrogator, if the tag happens to detect any error, the tag sends the interrogator an ISO 18000-7 error message. The interrogator then discontinues the exchange, and notifies the application program 101 of the error.

When the interrogator receives the message with the tag's authentication checksum, the interrogator independently computes an authentication checksum, and compares it to the authentication checksum received from the tag, in order to verify that they are identical. If the tag's authentication checksum is verified successfully, then the security shim 201 in the interrogator reassembles the various fragments it retrieved, decrypts the result, and replaces or recreates the missing ISO headers, in order to thereby end up with the ISO message that was the tag's response. The security shim 201 then passes this ISO message to the application program 101 in the interrogator.

The foregoing explanation relates to an exchange that began when the interrogator 12 decided to send an ISO P2P message to a single specific tag 16. However, as discussed earlier, the interrogator 12 can also broadcast to a plurality of different tags an ISO 18000-7 broadcast table query message having embedded within it a protected broadcast table query. In particular, the embedded message is a table query directed to one of the ISO tables 117-118 that is present in each of the tags, and is sent in an envelope message that is a table query to the Broadcast Request Table 253. The original command is compressed, encrypted and fragmented in a manner similar to that shown in FIG. 8, with two differences. The first difference is that the encryption is always carried out using the read-only keyset 272 of the tags to which the message is directed. It will be noted that these tags all need to share the same read-only keyset 272, but the other keysets 271, 273 and 274 can all be different and unique in each tag. The second difference relates to the compressed ISO headers in the tunneled message.

More specifically, the ISO headers of the tunneled message include a packet options field, which in turn contains a communication type bit. When the security shim 201 intercepts the message prepared by the application program 101, this communication type bit will be a binary "0", to indicate that the communication is a broadcast communication. But during the process of compressing the ISO headers, the security shim 201 in the interrogator generates a random bit that is referred to here as the collection query random bit "CQRB". The security shim 201 saves the CQRB for later use, and also stores this bit in the communication type bit of the packet options field in the compressed ISO headers, in place of the binary "0" that the interrogator 12 put there.

Figure 11:
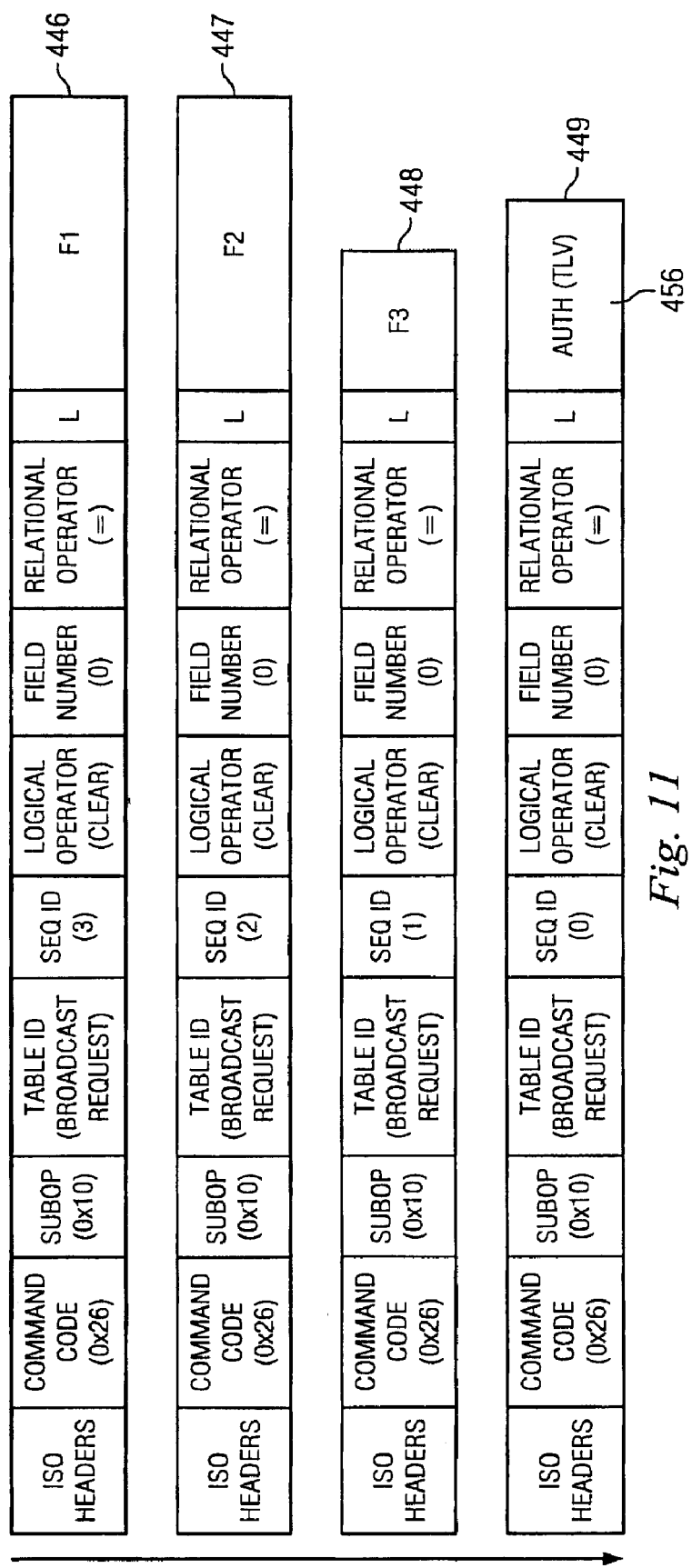
FIG. 11 is a diagram similar to FIG. 10, but showing four ISO 18000-7 envelope messages of a different type.

FIG. 11 is a diagram showing how the fragments of the original table query message are sent in several successive ISO table query messages 446-449 that are directed to the Broadcast Request Table 253 in the tags. The transmission of the messages 446-449 conforms to the ISO 18000-7 standard, and is therefore discussed here only briefly. The interrogator 12 successively transmits each of the messages 446-449, without receiving any response from any of the multiple tags.

The final message 449 contains authentication information 456, including a final sequence number, and an authentication checksum. The checksum is computed by concatenating all of the information in all of the messages 446-449, except for the checksum itself. The checksum is computed according to the message authentication algorithm of the protection suite identified in the cryptographic information TLV that is embedded within the fragment F1 in the first message 446, using the read-only keyset 272.

As each tag 16 is receiving the messages 446-449, the tag's security shim 202 monitors the ISO 18000-7 query collection command sequence numbers in those messages, using the table 279 (FIG. 5). In particular, if a received sequence number is less than or equal to the sequence number currently stored in the table 279 for interrogator 12, the security shim flags an error. Otherwise, the security shim 202 replaces the sequence number in the table 279 with the new sequence number. When the messages 446-449 have all been properly received, the tag locally computes its own authentication checksum for these messages, and compares it to the authentication checksum received in the final message from the interrogator, in order to verify that they are identical. If this authentication fails, then the tag discards the messages. But if the sequence and authentication information is all correct, then the security shim 202 in the tag decrypts and reassembles the original table query message. As part of the reassembly of the original message, and in particular as the compressed ISO headers are reconstructed, the security shim 202 saves the received CQRB bit for later use, and sets the communication type bit of the packet options field in the reconstructed headers to a binary "0". The security shim 202 then passes the reconstructed message on to the application program 111 of the tag.

In due course, and in a similar manner, the interrogator will transmit to all the tags a broadcast message containing a collection query command. When the security shim 202 in the tag passes this message on the tag's application program 111, the application program 111 will generate an ISO 18000-7 compliant reply message. The ISO headers of this message contain a tag status field, which in turn includes a "service bit" that represents tag's reply to the query. This ISO message is intercepted by the security shim 202 in the tag, and the security shim performs an exclusive or (XOR) between the service bit and the CQRB bit, and substitutes the result for the service bit. Then without further change or tunneling, the security shim 202 transmits the modified ISO message to the interrogator 12. Although this ISO message is not encrypted or tunneled, the true value of the service bit cannot be determined.

When the security shim 201 in the interrogator 12 receives this ISO message, it takes the modified service bit from the tag status field in the ISO headers, and carries out an exclusive or (XOR) between this modified service bit and the previously-saved CQRB bit, in order to thereby recover the original value of the service bit. The security shim substitutes this recovered original service bit for the modified service bit in the ISO headers of the message, and then passes the message on to the application program 101 in the interrogator.

As mentioned earlier, the ISO 18000-7 standard has provisions for the interrogator 12 to transmit to multiple tags a broadcast request for a universal data block (UDB), expecting that each tag will then prepare and return a UDB. In addition, the ISO 18000-7 standard has provisions for the interrogator 12 to transmit to one selected tag a P2P request for a UDB, and then only the selected tag will prepare and return a UDB.

For the purpose of this discussion, it is assumed that, in the disclosed embodiment of FIG. 5, the application program 101 in the interrogator 12 generates the broadcast ISO message for UDB collection. The security shim 201 does not apply any encryption or other form of security to that message. Instead, the security shim 201 transmits the message at 28 without any change. On the other hand, when each tag 16 responds, the tag's security shim 202 encrypts certain information in the UDB data that is being returned, as briefly mentioned earlier. This is explained in more detail below, with reference to FIG. 12.

Figure 12:
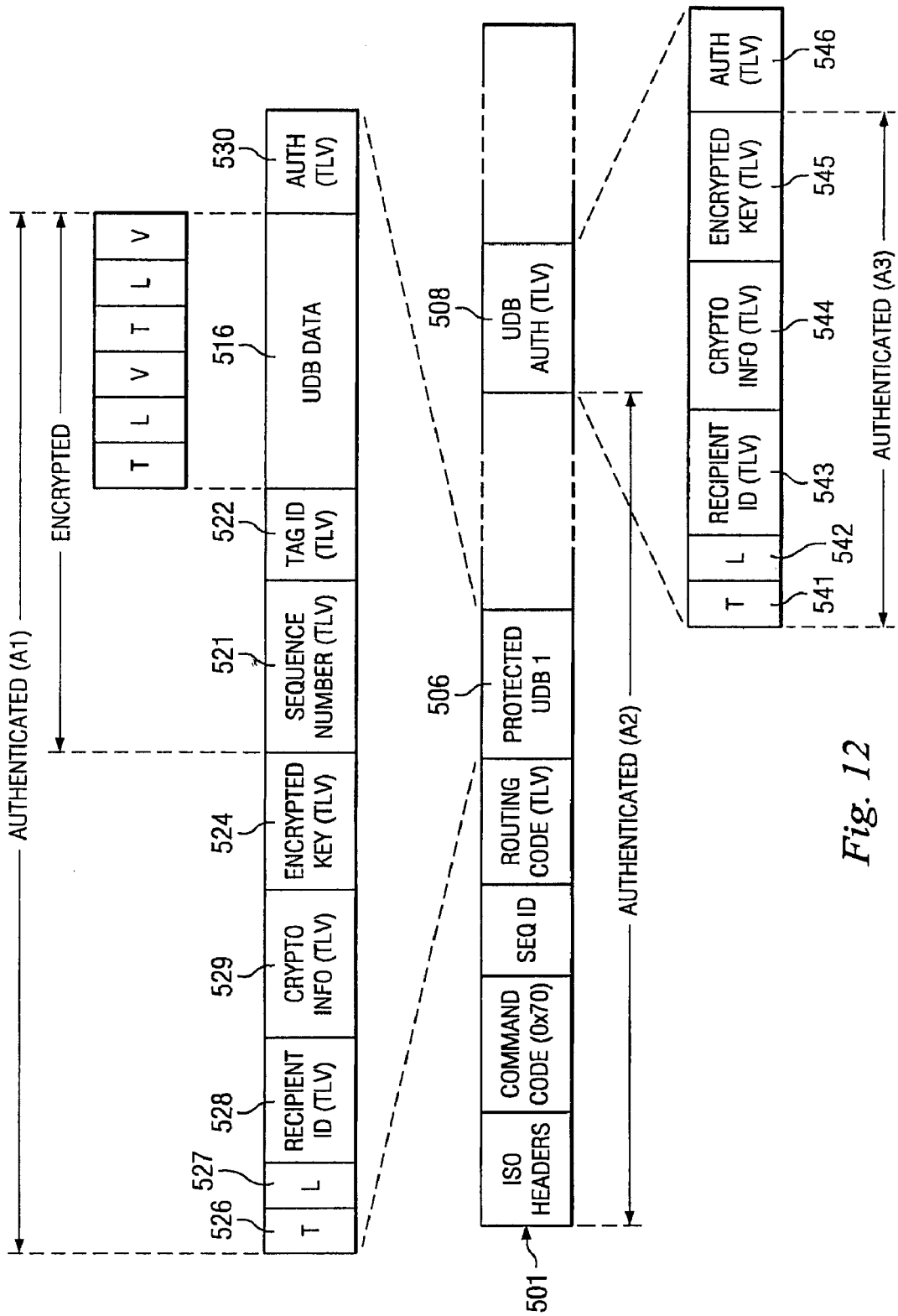
FIG. 12 is a diagram showing an ISO 18000-7 message 501 that is used within the system of FIG. 5 to send separately protected segments of universal data block (UDB) information to respective different recipients.

More specifically, FIG. 12 is a diagram showing an ISO message 501 that contains one or more protected blocks 506 of UDB data, and also one or more authentication blocks 508. The UDB blocks 506 and the authentication blocks 508 are provided in pairs. That is, each UDB block 506 is associated with a respective different authentication block 508. As discussed earlier in association with FIG. 5, the security shim 202 in the tag maintains a UDB recipient list 226, and in the disclosed embodiment this list contains at least two UDB access control objects 227 and 231. The UDB message 501 contains a respective UDB block 506 for each access control object in the list 226, and also contains a corresponding authentication block 508 for each access control object.

One of the UDB blocks 506 is shown in more detail in the upper portion of FIG. 12. It includes a section 516 of UDB data, and this section 516 contains one or more data elements that are each configured in a TLV format. As discussed above in association with FIGS. 5 and 6, the application program 111 responds to a UDB request by collecting all of the data elements in the tag that could possibly be returned in reply to a UDB request. As discussed in association with FIG. 6, each UDB access control object in the list 226 includes UDB access information, such as that shown at 229 or 233 in FIG. 6. The UDB access information defines which of the various UDB data elements the associated recipient is entitled to receive. In this example, as discussed above in association with FIG. 6, the UDB access information 229 for one recipient is different from the UBD access information 233 for another recipient. Thus, the section 516 in one UDB block 506 will contain one set of data elements specified by one recipient's UDB access information 229, whereas a different UDB block 506 will contain a different set of data elements identified by the other recipient's UDB access information 233. Moreover, as discussed above in association with FIG. 6, the UDB protection status information 241 will be used to determine whether or not each data element in each UDB block 506 will be protected by encryption.

In FIG. 12, each UDB block 506 includes a field 521 that contains a UDB sequence number in TLV format, and a further field 522 that contains tag identification information in TLV format. The tag identification information at 522 includes both the tag manufacturer identification 122 (FIG. 5) and also the tag serial number 124. The fields 516, 521 and 522 are encrypted by the security shim 202, using a randomly generated encryption key that is different for each UDB block 506. The random encryption key is then encrypted using the respective public key 228 or 232 (FIG. 5) of the intended recipient of the particular UDB block 506, and this encrypted key is placed in a field 524 of the block 506, in TLV format. The recipient of the block will have a private key corresponding to the public key 228 or 232, and will thus be able to decrypt the field 524 in order to retrieve the random key. The recipient can then use this random key to decrypt and authenticate the fields 516 and 521-522.

Each UDB block 506 also includes several other fields 526-530. The fields 526 and 527 are type and length information for the TLV format of the entire UDB block 506. The field 528 is a recipient identification in TLV format. In the disclosed embodiment, the recipient identification is the "distinguished name" from the particular recipient's X.509 certificate 225 or 230 (FIG. 5). The field 529 contains cryptographic information that will be needed by the recipient in order to decrypt the encrypted portions of the UDB 506. The field 530 contains authentication information in the form of a cryptographic checksum of all of the other fields (A1) in that particular UDB block 506, computed according to the authentication technique specified by the protection suite identified in the cryptographic information 529, and using the random key that appears in encrypted form in field 524.

The lower portion of FIG. 12 shows one of the authentication blocks 508 in greater detail. In the disclosed embodiment, each authentication block 508 includes six fields 541-546. The field 546 contains an authentication checksum that is based on all information (A2) in the message 501 other than the authentication blocks 508, as well as everything (A3) in this particular authentication block 508, other than the field 546 itself. The fields 541 and 542 contain type and length information for the TLV format of the entire authentication block 508. The field 543 contains a recipient identification which is the same as that in the field 528 of the corresponding UDB block 506. The field 544 contains a cryptographic information TLV of the type shown in FIG. 9, part of which is an identification of the authentication method used to generate the authentication checksum in the field 546. The authentication checksum is generated with a random key. This random key is then encrypted using the public key 228 or 232 from the digital certificate of the intended recipient, and placed in a field 545 of the authenticaion block 508.

The ISO message 501 of FIG. 12 containing UDB information is not itself encrypted and/or tunneled, because each of the UDB blocks 506 in this message 501 have portions that have already been separately encrypted. If the UDB blocks 506 and authentication blocks 508 have a collective size that is too large to be sent in a single ISO 18000-7 message, then this UDB "payload" is broken up into two or more segments in a manner specified by the ISO 18000-7 protocol, and the segments are sent in separate messages. Since persons skilled in the art are familiar with how, under the ISO 18000-7 standard, a UDB payload is to be segmented and how the segments are to be separately transmitted, that process is not shown and described in detail here. It is assumed for the sake of this discussion that the UDB payload is not sufficiently large to require segmentation. Consequently, the message shown at 501 will be wirelessly transmitted at 28 in the format shown at 501.

The security shim 201 in the interrogator 12 will receive the message 501, and then pass it on without change to the application program 101, which will then forward it on to each of the intended recipients. For example, assume that the users 22 and 23 in FIG. 5 respectively correspond to the UDB access control objects 227 and 231 in the tag 16. The application program 101 would forward the entire message 501 through the network 18 to each of the users 22 and 23. User 22 will have a private key that corresponds to the public key 228 in the certificate 225, and will thus have cryptographic access to one UDB block 506 and the associated authentication block 508. The user 23 will have a different private key that corresponds to the public key 232 in the certificate 230, and will thus have cryptographic access to a different UDB block 506 and the associated authentication block 508. The user 22 will be able to verify the two authentication checksums 530 and 546 in its pair of blocks 506 and 508, and the user 23 will be able to separately verify the authentication checksums in the fields 530 and 546 of its pair of blocks 506 and 508.

With reference to FIG. 5, when the tag 16 is first being commissioned, the tag owner will install the security officer access control object 210 that contains the root certificate 212. At this point, the list 211 will not contain any other certificates, and the list 226 will be empty. Further, the cryptographic keysets in table 270 will not yet be defined.

After the tag owner installs the access control object 210 containing the root certificate 212, the next step in the commissioning procedure is for a security officer (for example the user 21) to authenticate himself to the tag, for the purpose of defining keysets 271-274 that will allow the security shims 201 and 202 to exchange protected information in the manner described above. The first task that the security officer must complete is to establish the security officer keyset 271, in a manner explained in more detail below. As this is carried out, the security shim 201 transmits information to the tag 16, using table write fragment commands that store information fragments in the P2P Request Table 251, and using table read fragment commands to read information fragments from the P2P Response Table 252, in a manner generally similar to that already described above. One difference is that, with reference to FIG. 7, the protection suite used for these particular exchanges is the NULL-NULL protection suite. In other words, the security shims 201 and 202 exchange P2P ISO messages without using any encryption or authentication. This is because the exchange of information between the security officer and the tag in this particular situation is configured to be self-protecting.

Figure 13:
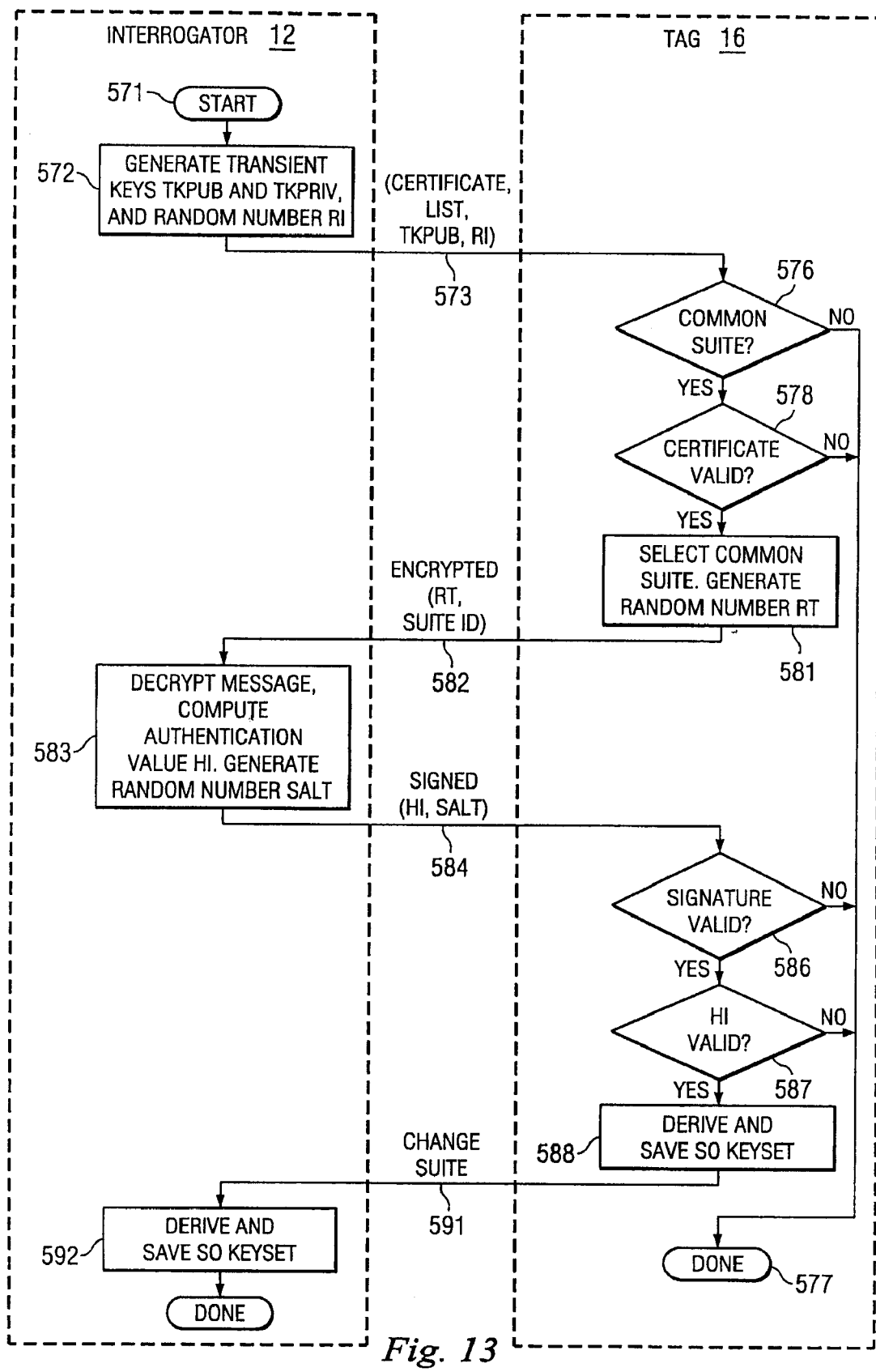
FIG. 13 is a flowchart showing part of a procedure used to initialize an RFID tag in the system of FIG. 5.

In more detail, FIG. 13 is a flowchart showing how a security officer can, through the interrogator 12, authenticate to the root certificate 212 in the tag 16, determine a protection suite, and establish the security officer keyset 271. This procedure begins at 571. In block 572, the security officer has the security shim 201 generate a transient random public key and a transient random private key, which are respectively shown at 316 and 317 in FIG. 5. The security officer also has the interrogator's security shim 201 generate a random number RI. The security officer then has the security shim 201 transmit selected information to the tag at 573, using the tunneling technique discussed above in association with FIGS. 8 and 10, but with the NULL-NULL protection suite (FIG. 7). The information transmitted at 573 includes the security officer's digital certificate 301 (including its embedded public key 302), the list 311 of protection suites supported by the security shim 201 in the interrogator, the transient public key 316, and the random number RI.

Upon receiving this information, the security shim 202 in the tag compares the protection suite list 311 from the interrogator 12 to its own protection suite list 258, in order to determine whether or not there is at least one protection suite common to both lists (other than the NULL-NULL protection suite). If there is no common protection suite, then the security shim 202 terminates its participation in the transaction, as indicated at 577. Otherwise, the security shim 202 proceeds to block 578, where it checks to see if the digital certificate 301 from the security officer is valid. For example, the digital certificate 301 specifies a range of dates within which it is valid, and the security shim 202 can verify that the current date maintained in the tag using clock 52 (FIG. 1) is within the range of dates specified by the certificate. The security shim 202 can also check the integrity of the certificate by verifying the issuer's signature, using the public key 302 from the security officer's digital certificate 301. If the security shim 202 determines that there is a problem with the digital certificate 301 of the security officer, the security shim terminates the transaction at 577.

Otherwise, at block 581, the security shim 202 selects one protection suite that is common to both of the lists 311 and 258 (other than the NULL-NULL protection suite). The security shim 202 also generates a random number RT. Then, the security shim 202 uses the transient public key 316 received from the interrogator at 573 to encrypt both the random number RT and an identification of the selected protection suite. Then, at 582, this information is transmitted back to the security shim 201 in the interrogator 12. The transfer of this information is effected by putting the information in the P2P Response Table 252, and then notifying the security shim 201 in the interrogator, so that the security shim 201 can retrieve this information from the table 252 in the manner discussed earlier. The protection suite selected by the tag at block 581 is not yet in effect, and so all of the exchanges shown in FIG. 13 are carried out using the NULL-NULL protection suite.

At block 583, the security shim 201 in the interrogator decrypts the information that it received at 582 from the security shim 202 in the tag. The security shim 201 then computes an authentication value HI, according to the authentication technique identified in the protection suite selected by the security shim 202 in the tag, and using the random key RT received from the security shim 202. In addition, the security shim 201 generates a further random number SALT. The security shim 201 concatenates the authentication value HI and the random number SALT, and signs the concatenated result with the private key 303 associated with the digital certificate 301. This signed information is then transmitted at 584 to the security shim 202 in the tag. Upon receiving this information, the security shim 202 uses the public key 302 that it received in the security officer's certificate 301, and verifies the signature in the information received at 584. If the signature is not valid, then the security shim 202 ends the transaction at 577.

Otherwise, the security shim 202 in the tag proceeds to block 587, where it locally computes its own authentication checksum HT, and then compares this to the authentication checksum HI from the interrogator, in order to verify they are identical. If they are different, then the security shim 202 terminates the transaction at 577. Otherwise, the security shim 202 proceeds to block 588, where it generates the security officer (SO) keyset 271. In this regard, the various messages received from the interrogator each include the interrogator identification code 103 (FIG. 5), and of course the security shim 202 has also received from the interrogator's security shim 201 the random numbers RI and SALT. The tag's security shim 202 concatenates (1) the random number SALT, (2) the random number RT, (3) the random number RI, (4) the tag serial number 124, (5) the tag manufacturer identification 122, and (6) the interrogator identification 103. The security shim 202 then uses this concatenated information as an input to well-known algorithm referred to in the art as PBKDF2 (Password-Based Key Derivation Function), in order to derive material that is used as the security officer keyset 271. This keyset includes both an encryption key, and an authentication key. The tag's security shim 202 saves this keyset at 271. Next, at 591, the security shim 202 sends to the interrogator's security shim 201 a message that instructs the security shim 201 to change protection suites. The security shim 202 then switches from use of the NULL-NULL protection suite to use of the protection suite selected at block 581.

When the interrogator's security shim 201 receives the message sent at 591, the it already has in hand all of the same information used by the tag's security shim 202 to generate the security officer keyset. Accordingly, at block 592, the interrogator's security shim 201 separately derives and saves the security officer keyset 271 in the same manner that this keyset was derived by the tag's security shim 202, in particular by concatenating the same information and then using the same PBKDF2 function. The security shim 201 in the interrogator then switches from use of the NULL-NULL protection suite to use of the protection suite selected by the tag at block 581. Thereafter, any further communications between the security officer and the tag will still be effected with tunneled messages routed through the P2P Request and Response Tables 251 and 252, but using the security officer keyset 271, and the protection suite selected at 581.

In this regard, the security officer can use the selected protection suite and the security officer keyset 271 to send the tag's security shim 202 a read-only keyset, which the security shim 202 stores at 272 for later use. As mentioned earlier, the security officer will normally provide this same read-only keyset to many different tags, so that broadcast messages sent to multiple tags can contain information encrypted with this keyset, and the various tags will each be able to decrypt the encrypted information.

The security officer can also use the security officer keyset 271 and the selected protection suite to instruct the tag's security shim 202 to generate a read/write keyset. The security shim 202 will then generate random numbers for use as the read/write keyset, store the read/write keyset at 273, and send the read/write keyset 273 back to the interrogator's security shim 201. Further, the security officer can use the security officer keyset 271 and the selected protection suite to instruct the tag's security shim 202 to generate a tag response keyset. The security shim 202 then generates random numbers for use as the tag response keyset, stores the tag response keyset at 274, and sends the tag response keyset to the interrogator's security shim 201.

Using the security officer keyset and the selected protection suite, the security officer can also instruct the tag's security shim 202 to invalidate all of the keysets that are currently stored in the table 270, including the security officer keyset 271. This is a two-step procedure. First, the security officer sends a message instructing the tag's security shim 202 to invalidate all of the local keysets stored in table 270. The security shim 202 then sends back a message containing a random number. The interrogator's security shim 201 then increments the random number by 1 modulo $2^{96}$, and sends the result to the tag's security shim 202. The security shim 202 checks the incremented value and, if it is correct, the security shim 202 invalidates all of the keysets stored in the table 270.

Using the security officer keyset 271 and the selected protection suite, the security officer can optionally install additional access control objects in the tag. For example, the security officer can optionally install one or more additional security officer access control objects in the list 211, such as the certificate shown in broken lines at 220. In addition, the security officer can optionally install one or more UDB access control objects in the list 226, such as those shown in broken lines at 227 and 231. When the security officer installs an additional access control object 220 in the list 211, the tag access rights for that additional object cannot be greater than the tag access rights of the existing access control object that was used to create the security officer keyset being used by the security officer.

The security officer can view access control objects already installed on the tag, by sending a message that requests a list of the installed objects. In response, the tag will return a list containing the "subject name" field from the digital certificates in each of the access control objects currently installed in each of the lists 211 and 226 on the tag.

The security officer can use the security officer keyset 271 and the selected protection suite to optionally remove any of the access control objects that are already installed in either of the lists 211 and 226, except for the access control object 210 containing the root certificate 212. The procedure for removing an access control object is similar to that for invalidating the keysets in table 270. In particular, the security officer sends a request that a particular access control object be deleted, and the security shim 202 in the tag returns a random number. The security officer then increments the random number by 1 modulo $2^{96}$, and returns the result. The tag's security shim 202 checks the incremented result and, if it is correct, the security shim deletes the specified access control object.

The tag 16 maintains a not-illustrated log of all attempts to authenticate to or access the tag, including not only successful attempts, but also unsuccessful attempts.

Figure 14:
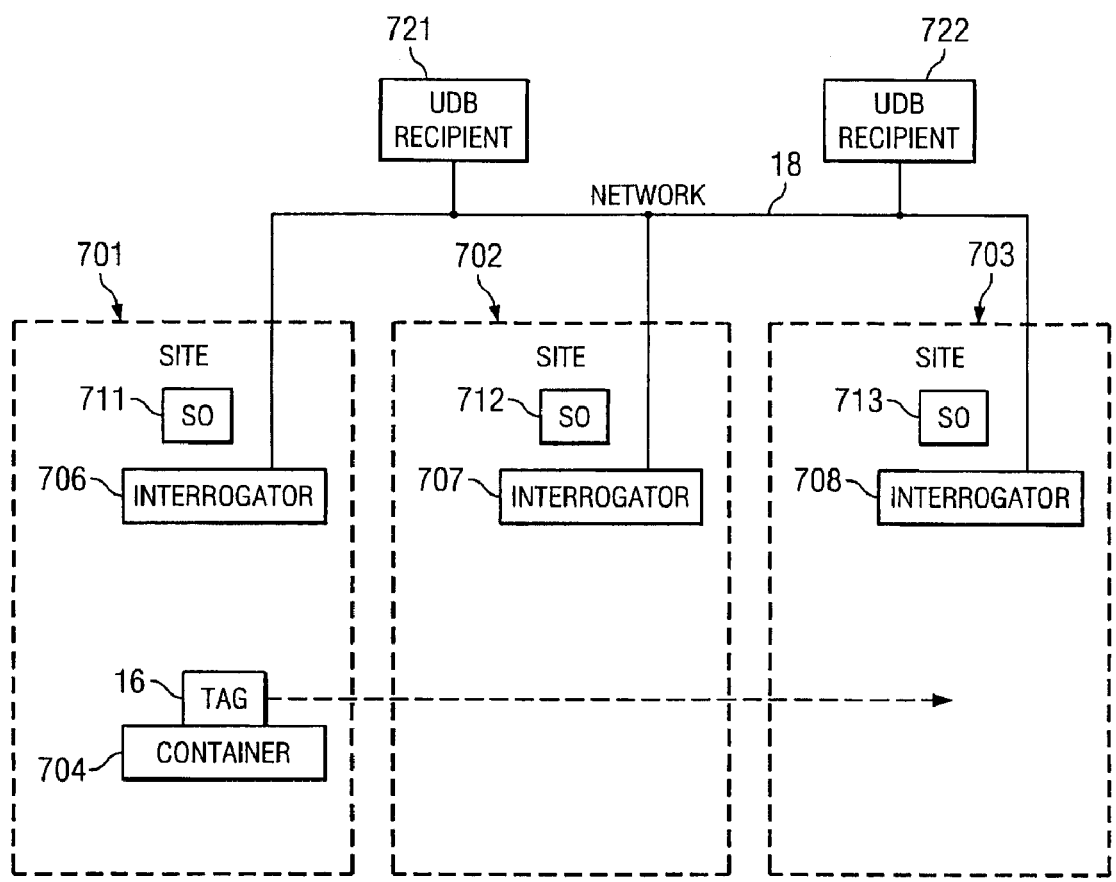
FIG. 14 is a diagram showing three different sites that are geographically spaced from each other, and that each utilize an RFID system of the type shown in FIG. 5.

FIG. 14 is a diagram showing three different sites 701, 702 and 703 that are geographically spaced from each other. For the purpose of this discussion, it is assumed by way of example that the site 701 is a manufacturer's facility, that the site 702 is a shipping hub, and that the site 703 is a customer's facility. Products manufactured at the site 701 are loaded into a container 704, and the previously-described tag 16 is physically attached to the container 704. The container 704 with the tag 16 will be shipped by truck from the manufacturer's site 701 to the shipping hub 702, where the container 704 will be switched from the original truck to a further truck. The container 704 with the tag 16 will then be transported by the further truck from the site 702 to the customer's site 703, where the products will be removed from the container.

The site 701 has an interrogator 706, the site 702 has an interrogator 707, and the site 703 has an interrogator 708. The interrogators 706-708 are each identical to the interrogator 12 that was described earlier, but have been given different reference numerals in FIG. 14 so that they can be separately identified. The interrogators 706-708 are operatively coupled by the network 18, which has already been discussed above. The site 701 has a person 711 who serves as a security officer (SO), the site 702 has a person 712 who serves as a security officer, then the site 703 has a person 713 who serves as a security officer. With reference to FIGS. 5 and 14, it is assumed for the purpose of this discussion that, when the tag 16 is attached to the container 704 at site 701, the access control object 210 containing root certificate 212 has already been installed in the tag 16 by the tag owner. It is also assumed that, at that time, no other access control objects have been installed in either of the lists 211 and 226, and that the keysets in table 270 have not yet been established.

The security officer 711 at the site 701 uses the interrogator 706 to validate to the tag 16, in the manner discussed above in association with FIG. 13. As explained above, this results in the selection of a protection suite (FIG. 7), and the generation of the security officer keyset 271. The security officer 711 then proceeds to interact with the tag in order to also establish the read-only keyset 272, the read/write keyset 273 and the tag response keyset 274. The security officer 711 then distributes the read-only keyset 272 and the tag response keyset 274 to other not-illustrated persons at the site 701 who have operator status (Table 2). Further, the security officer 711 distributes the read-only keyset 272, the read/write keyset 273 and the tag response keyset 274 to other not-illustrated persons at the site 701 who have administrator status. This distribution of keysets will normally occur electronically under a secure protocol, but in some situations the keysets may be distributed in some other manner. For example, the binary values in a keyset could be converted into a printable format (for example base 64 or base 32), and then printed out. The printed information could then be given to a user (such as the user 24 in FIG. 1) who would then manually enter the information into an interrogator (for example using the manual keypad 66 of the handheld interrogator 13).

The security officer 711 then installs two additional security officer access control objects in the list 211. One of these is the access control object 220. If the tag receives a communication from the security officer 712 at site 702, the tag can use the certificate 221 in the object 220 to authenticate the security officer 712. The third access control certificate in the list 211 is not shown in FIG. 5, but if the tag receives a communication from the security officer 713 at site 703, the tag can use the third access control object to authenticate the security officer 713. The security officer 712 at site 702 will be provided with a security officer certificate that corresponds to the certificate 221 in the access control object 220, and that is similar in type to the security officer certificate 301. The security officer 713 at site 703 will be provided with a further security officer certificate that corresponds to the certificate in the third access control object in the list 211, and that is similar in type to the security officer certificate 301.

The security officer 711 may also optionally install one or more UDB access control objects in the list 226, for respective UDB recipients. For the purpose of the exemplary situation being discussed here, it is assumed that the security officer 711 installs the UDB access control object 227, and that the certificate 225 in this object indicates a UDB recipient 721 is to receive UDB information. Further, it is assumed that the security officer 711 installs the UDB access control object 231, and that the certificate 230 in this object indicates that a UDB recipient 722 is to receive UDB information. In this example, the UDB recipients 721 and 722 are each a person or entity that does not fall within any of the four security levels listed in Table 2.

The keysets in table 270 can remain in effect so long as the tag 16 remains at the site 701, unless local security policy specifies that they should be invalidated and replaced sooner. It is assumed for the sake of this discussion that the keysets in table 270 are permitted to remain in effect so long as the tag is at the site 701. While the tag 16 is at the site 701, persons with operator status or administrator status can interact with the tag 16. For example, a person with administrator status may install on the tag 16 a manifest (inventory) of the products that have been loaded into the associated container 704. Eventually, when the truck carrying the container 704 and tag 16 is ready to depart the site 701, the security officer 711 uses the security officer keyset 271 to instruct the tag 16 to invalidate all four of the keysets 271-274 that are stored in table 270. Alternatively, the departure gate from the site 701 could be a choke point having an interrogator or reader that automatically invalidates the keysets in table 270 on every tag departing the site 701.

The container 704 with tag 16 will then be transported by the truck to the shipping hub site 702. After the container 704 and tag 16 arrive at the site 702, the security officer 712 at that site will use the interrogator 707 to authenticate to the certificate 221 in the tag 16, using the technique described above in association with FIG. 13. This will result in the selection of a protection suite for use at the site 702, and also the creation of a unique security officer keyset that will be stored in the tag at 271, and used by the security officer 712 to communicate with the tag. The security officer 712 will then establish additional keysets 272-274 for use within the site 702, and will distribute these keysets to other persons at the site 702 who have operator or administrator status with respect to the tag 16.

Assume that, while the tag 16 is at the site 702, the tag receives through the interrogator 707 an ISO message that instructs the tag 16 to prepare and transmit UDB information. The tag 16 will then create and transmit a message of the type shown at 501 in FIG. 12, including one UDB block 506 that is based on the access control object 227 and intended for the UDB recipient 721, and a further UDB block 506 that is associated with the access control object 231 and intended for the UDB recipient 721. The message 501 will also include two authentication blocks 508, each of which is associated with a respective one of the two UDB blocks 506. Interrogator 707 will forward the message 501 through the network 18 to each of the UDB recipients 721 and 722.

The UDB recipient 721 has a private key that corresponds to the public key 228 in the UDB certificate 225. The recipient 721 uses that private key to decrypt the random keys received at 524 and 545 in the UDB block 506 and associated authentication block 508 that are intended for the UDB recipient 721. The recipient 721 can use the authentication information to authenticate the received message, and can access the UDB data 516. In a similar manner, the UDB recipient 722 has a private key that corresponds to the public key 232 in the UDB certificate 230. The UDB recipient 722 uses that private key to decrypt the random keys received at 524 and 545 in the UDB block 506 and associated authentication block 508 that are intended for the recipient 722. The UDB recipient 722 can use the authentication information to authenticate the received message, and can access the UDB data 516.

In this manner, UDB recipient 721 can access the UDB data in the message 501 for which the recipient 721 is the intended recipient, but not UDB information intended for any other recipient, such as the UDB recipient 722. Similarly, the UDB recipient 722 can access the UDB data in the message 501 for which the recipient 722 is the intended recipient, but not UDB information intended for any other recipient, such as the UDB recipient 722. It should also be noted that, as the message 501 with encrypted UDB information is passing through the network 18 from site 702 to the UDB recipients 721 and 722, the message 501 may pass through computers or systems of third parties, but those third parties will not be able to access or view any of the encrypted UDB information that is present within the message.

After the container 704 with the tag 16 has been shifted from the original truck to a further truck at the site 702, and when the further truck is preparing to depart the site 702, the security officer 712 will instruct the tag 16 to invalidate all of the keysets that are stored on the tag in table 270. Alternatively, the departure gate from the site 702 could be a choke point having an interrogator or reader that automatically invalidates the keysets in table 270 on every tag departing the site 702.

Eventually, the further truck carrying the container 704 and the tag 16 will arrive at the customer's site 703. The security officer 713 at that site will use the interrogator 708 to authenticate to the third (not-illustrated) certificate in the list 211, in order to select a protection suite and establish a security officer keyset that the tag stores at 271. The security officer 713 will also establish all the additional keysets 272-274 for use at the site 703, and distribute these additional keysets to appropriate persons at site 703. After the container 704 has been unloaded, the tag 16 will be removed from the container. A person with administrator status may remove information from the tag that is viewed as sensitive or confidential, such as the manifest or inventory for the container 704. The security officer 713 will then instruct the tag to invalidate all the keysets stored in table 270. The security officer 713 may also remove one or more of the additional access control objects that are installed in the list 211 or in the list 226, except that the security officer 713 cannot remove the access control object 210 containing the root certificate 212. When the tag is eventually returned to the tag owner, the tag owner can remove and/or replace the access control object containing the root certificate 211.

The RFID system 10 of FIGS. 1 and 5-14 provides a high level of security for information exchanged between an interrogator and a tag, as well as information maintained in the tag, while remaining fully compatible with the existing ISO 18000-7 standard. Moreover, the security provisions are structured so that they can be implemented with just a firmware upgrade in existing interrogators and tags, without any hardware change. Consequently, many existing interrogators and tags can be relatively easily and cheaply upgraded, while avoiding the expense of completely replacing them, or the expense and logistical problems involved in implementing hardware alterations. Avoiding the need for extra hardware in tags also avoids the increased power consumption that would be associated with added hardware, and thus helps to avoid a reduction in the period of time that a tag can operate before its battery needs to be changed or recharged.

Although selected embodiments have been illustrated and described in detail, it should be understood that a variety of substitutions and alterations are possible without departing from the spirit and scope of the present invention, as defined by the claims that follow.

What is claimed is:

1. A radio frequency identification (RFID) system, comprising:
   a plurality of RFID tags; and
   at least one RFID interrogator, wherein the at least one RFID interrogator comprises:
   a transmitter configured to wirelessly transmit an interrogation communication to the plurality of tags at a predetermined carrier frequency;
   a receiver configured to receive a response frequency from the plurality of tags at the predetermined carrier frequency; and
   a memory, the memory storing a firmware module, the firmware module including a security shim, wherein:
   the security shim is configured to encrypt at least a portion of the interrogation communication with a first key, the first key being randomly generated for each transmitted communication;
   the security shim is configured to encrypt the first key with a second key corresponding to a private key stored in a memory of at least one of the plurality of tags; and
   the transmitter is further configured to transmit the interrogation communication including the at least one encrypted portion and the encrypted first key.

2. The system according to claim 1, wherein the encrypted portion of the interrogation communication includes a command for at least one of the plurality of tags.

3. The system according to claim 1, wherein the at least one tag storing the private key can receive said encrypted interrogation communication and decrypt said encrypted portion thereof with said private key.

4. The system according to claim 3, wherein a plurality of the tags lack possession of the private key.

5. The system according to claim 1, wherein said interrogation communication conforms to a communications protocol, and has a payload that includes said encrypted portion.

6. The system according to claim 5, wherein said communications protocol is ISO 18000-7.

7. A method of operating a tag, comprising:
receiving a first sequence of wireless communications that each contain encrypted information and sequencing information regarding said first sequence while receiving a second sequence of wireless communications that each include encrypted information and sequencing information regarding said second sequence, using a single transceiver operating at a fixed carrier frequency to receive said first and second sequences; and
monitoring said sequencing information from received communications of said first sequence while separately monitoring said sequencing information from received communications of said second sequence, the monitoring comprising:
comparing a first sequence number associated with the first sequence with a second sequence number associated with the second sequence;
determining that an error has occurred if the second sequence number is less than or equal to the first sequence number;
calculating, by the tag, an authentication checksum;
comparing the calculated authentication checksum with a predetermined authentication checksum associated with the first sequence and the second sequence; and
decrypting the encrypted information associated with the first sequence and the second sequence if the calculated authentication checksum is equal to the predetermined authentication checksum and no error is determined by comparing the first sequence number and the second sequence number.

8. A method according to claim 7, including transmitting said first and second sequences from respective different sources.

9. A method according to claim 7, including:
transmitting said first sequence from a first interrogator; and
transmitting said second sequence from a second interrogator different from said first interrogator.

10. A method according to claim 7, wherein said monitoring of each said sequence further comprises identifying a situation in which a received communication of that sequence is a duplicate of a previously-received communication of that sequence.

* * * * *